(12) United States Patent
Wang et al.

(10) Patent No.: US 12,038,546 B2
(45) Date of Patent: Jul. 16, 2024

(54) METHODS TO ESTIMATE FORMATION SLOWNESS FROM MULTI-BOREHOLE MODES AND OF A MULTI-MODE DISPERSION WAVE AND MULTI-MODE DISPERSION ESTIMATION SYSTEMS

(71) Applicant: Halliburton Energy Services, Inc., Houston, TX (US)

(72) Inventors: Ruijia Wang, Singapore (SG); Jiajun Zhao, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 570 days.

(21) Appl. No.: 17/171,749

(22) Filed: Feb. 9, 2021

(65) Prior Publication Data
US 2022/0252750 A1 Aug. 11, 2022

(51) Int. Cl.
*G01V 1/50* (2006.01)
*G01V 1/28* (2006.01)

(52) U.S. Cl.
CPC ............. *G01V 1/50* (2013.01); *G01V 1/284* (2013.01); *G01V 2200/16* (2013.01); *G01V 2210/47* (2013.01)

(58) Field of Classification Search
CPC ...... G01V 1/50; G01V 1/284; G01V 2200/16; G01V 2210/47
See application file for complete search history.

(56) References Cited

U.S. PATENT DOCUMENTS

| | | | |
|---|---|---|---|
| 5,278,805 A | 1/1994 | Kimball | |
| 7,120,541 B2 | 10/2006 | Wang | |
| 7,643,374 B2 | 1/2010 | Plona et al. | |
| 7,698,066 B2 | 4/2010 | Huang et al. | |
| 8,456,952 B2 | 6/2013 | Tang et al. | |
| 2019/0025452 A1* | 1/2019 | Wang | E21B 49/00 |

FOREIGN PATENT DOCUMENTS

| | | | |
|---|---|---|---|
| WO | 2014070182 A1 | 5/2014 | |
| WO | 2018080450 A1 | 5/2018 | |
| WO | WO-2018231234 A1 * | 12/2018 | ............ G01V 1/162 |
| WO | WO-2020139362 A1 * | 7/2020 | ............ G01V 1/284 |

* cited by examiner

*Primary Examiner* — Krystine E Breier
(74) *Attorney, Agent, or Firm* — Barnes & Thornburg LLP

(57) ABSTRACT

Methods to estimate formation slowness from multi-borehole modes and multi-mode dispersion estimation systems are presented. The method includes obtaining waveform data of a plurality of waves traversing through a downhole formation, wherein each wave of the plurality of waves has a different threshold cutoff frequency, and performing a multimode dispersion analysis of the waveform data to generate a semblance map of the wave comprising the plurality of waves. The method also includes obtaining a slowness dispersion of a wave of the plurality of waves, and determining a formation type of the wave based on one or more properties of the plurality of waves. The method further includes determining an initial body wave slowness estimate of the wave, generating a modeling of the wave, and reducing a mismatch between the modeling of the wave and the slowness dispersion of the wave to improve the modeling of the wave.

13 Claims, 17 Drawing Sheets

METHODS TO ESTIMATE FORMATION SLOWNESS FROM MULTI-BOREHOLE MODES AND OF A MULTI-MODE DISPERSION WAVE AND MULTI-MODE DISPERSION ESTIMATION SYSTEMS

BACKGROUND

The present disclosure relates generally to methods to estimate formation slowness from multi-borehole modes and multi-mode dispersion estimation systems.

Acoustic wave processing methods sometimes utilize a single mode to estimate formation body wave slowness, such as to estimate formation shear wave slowness and formation compressional wave slowness. Such techniques sometimes utilize the lowest order of flexural waves to invert shear wave slowness in wireline logging. Similarly, one often uses the lowest order of screw waves to estimate shear wave slowness in the situation of logging while drilling. However, in some instances, for example, quadrupole logging while drilling data in a hard formation, or wireline dipole data in a large borehole, the dispersion curve of the first order, screw, or flexural waves may be affected by strong low-frequency road and drilling noise, resulting in missing the low-frequency asymptotes. In other cases, for example, wireline logging in a deviated well with a small size borehole, the first flexural waves may not be well developed.

BRIEF DESCRIPTION OF THE DRAWINGS

Illustrative embodiments of the present disclosure are described in detail below with reference to the attached drawing figures, which are incorporated by reference herein, and wherein.

Figure 1A:
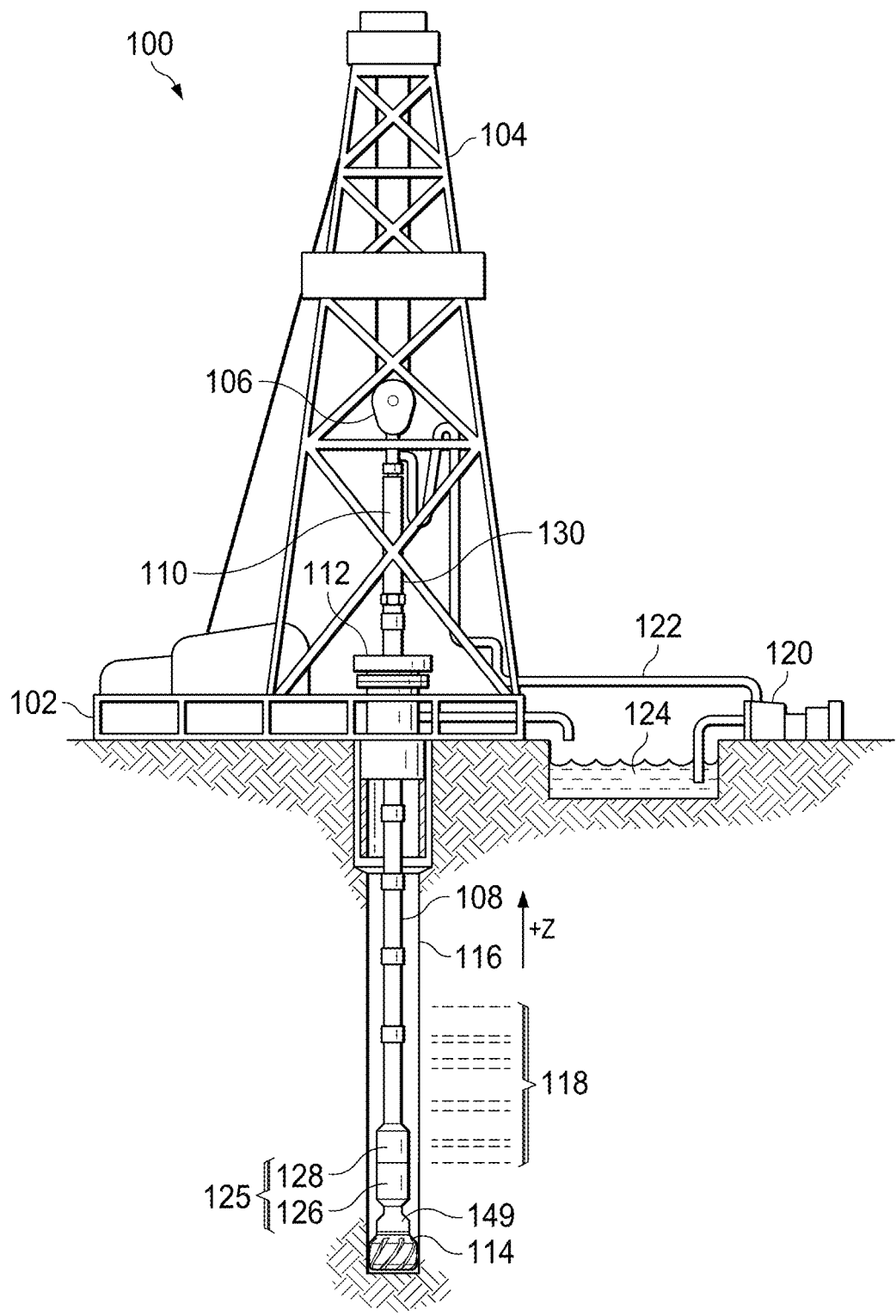
FIG. 1A illustrates a diagrammatic view of an example logging while drilling wellbore operating environment.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to methods to estimate formation slowness from multi-borehole modes and multi-mode dispersion estimation systems. Waveform data of waves traversing through a downhole formation are measured by a sonic logging tool disposed in a wellbore. In some embodiments, the sonic logging tool is a wireline logging tool and some of the operations described herein are performed during a wireline logging operation. In some embodiments, the logging tool is a logging while drilling sonic tool and some of the operations described herein are performed during a logging while drilling operation. A multi-mode dispersion analysis is performed, one or more slowness frequency semblance maps are generated, and slowness dispersions of the waves are obtained. As referred to herein, multi-mode refers to multiple waves, such as a multi-mode analysis of the waveform data, and refers to analyzing multiple waves of the waveform data. In some embodiments, the peaks of the semblance map are analyzed and the slowness dispersions of the waves are extracted from the peaks in the semblance map. In some embodiments, the slowness dispersions are obtained through a processing approach, such as through the Prony method or the Matrix-pencil method, without calculating a slowness-frequency semblance map. In some embodiments, one or more tool waves are removed from the semblance map and the candidate slowness dispersion peaks. A formation type of a formation the waves traverse through are then determined based on the properties of the waves. As referred to herein, the formation type of a formation refers to whether the formation shear wave speed is faster or slower than the mud compressional wave speed. In some embodiments, the formation type of the formation is determined from the semblance map. In some embodiments, slowness density logs of the waves are generated, candidate slowness dispersion peaks are generated from the slowness density logs, and the formation type determined from the slowness dispersion peaks. As referred to herein, a slowness density log is a statistic curve of the slowness intensity for a dispersion curve on the slowness axis. In some embodiments, a type or category of each wave (e.g., whether the wave is a refracted wave, compressional wave, or shear wave; whether the wave is a first order screw wave, a second order screw wave, or a higher order screw wave, etc.) is identified based on the formation type. As referred to herein, an order of wave refers to a wave having a threshold cut-off frequency, where a higher order wave has a cut-off frequency that is greater than the cut-off frequency of a lower order wave. An initial body wave slowness of the waves is determined based on the properties of the wave. In some embodiments, the initial body wave slowness is estimated based on the modal slowness and the modal category of the waves. In some embodiments, one or more models of the waves are generated. In some embodiments, mismatches between the modelings of the waves and the slowness dispersion of the waves are reduced to improve or optimize the modelings of the waves. Additional descriptions of methods to estimate formation slowness from multi-borehole modes and multi-mode dispersion estimation systems are provided in the paragraphs below and are illustrated in FIGS. 1-15.

Turning now to the figures, FIG. 1A illustrates a diagrammatic view of an exemplary logging while drilling and/or measurement while drilling wellbore operating environment 100 in which the present disclosure may be implemented. As depicted in FIG. 1A, a drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the wellbore 116 into retention pit 124 and aids in maintaining the integrity of the wellbore 116. Various materials can be used for drilling fluid, including oil-based fluids and water-based fluids.

As depicted in FIG. 1A, logging tools 126 are integrated into the bottom-hole assembly 125 near the drill bit 114. As the drill bit 114 extends to the wellbore 116 through the various formations 118, logging tools 126 collect measurements relating to various formation properties as well as the orientation of the tool and various other drilling conditions. The bottom-hole assembly 125 may also include a telemetry sub 128 to transfer measurement data to a surface receiver 130 and to receive commands from the surface. In some embodiments, the telemetry sub 128 communicates with a surface receiver 130 using mud pulse telemetry. In other cases, the telemetry sub 128 does not communicate with the surface, but rather stores logging data for later retrieval at the surface when the logging assembly is recovered. Notably, one or more of the bottom-hole assembly 125, the logging tools 126, and the telemetry sub 128 may also operate using a non-conductive cable (e.g. slickline, etc.) with a local power supply, such as batteries and the like. When employing non-conductive cable, communication may be supported using, for example, wireless protocols (e.g. EM, acoustic, etc.) and/or measurements and logging data may be stored in local memory for subsequent retrieval at the surface, as is appreciated by those skilled in the art.

Each of the logging tools 126 may include a plurality of tool components, spaced apart from each other, and communicatively coupled with one or more wires. Logging tools 126 may include tools configured to perform acoustic (e.g., "sonic") logging. The telemetry sub 128 may include wireless telemetry or logging capabilities, or both, such as to transmit or later provide information indicative of received acoustic energy/waveforms to operators on the surface or for later access and data processing for the evaluation of formation 118 properties.

The logging tools 126, including the acoustic logging tool, may also include one or more computing devices 149 communicatively coupled with one or more of the plurality of tool components. The computing device 149 may be configured to control or monitor the performance of the logging tools 126, process logging data, and/or carry out the methods of the present disclosure.

In some embodiments, one or more of the logging tools 126 may communicate with a surface receiver 130, such as a wired drill pipe. In other cases, the one or more of the logging tools 126 may communicate with a surface receiver 130 by wireless signal transmission. In at least some cases, one or more of the logging tools 126 may receive electrical power from a wire that extends to the surface, including wires extending through a wired drill pipe. In at least some instances, the methods and techniques of the present disclosure may be performed by a computing device (not shown) on the surface. In some embodiments, the computing device may be included in surface receiver 130. For example, surface receiver 130 of wellbore operating environment 100 at the surface may include one or more of wireless telemetry, processor circuitry, or memory facilities, such as to support substantially real-time processing of data received from one or more of the logging tools 126. In some embodiments, data is processed at some time subsequent to its collection, wherein the data may be stored on the surface at surface receiver 130, stored downhole in telemetry sub 128, or both, until it is retrieved for processing.

Figure 1B:
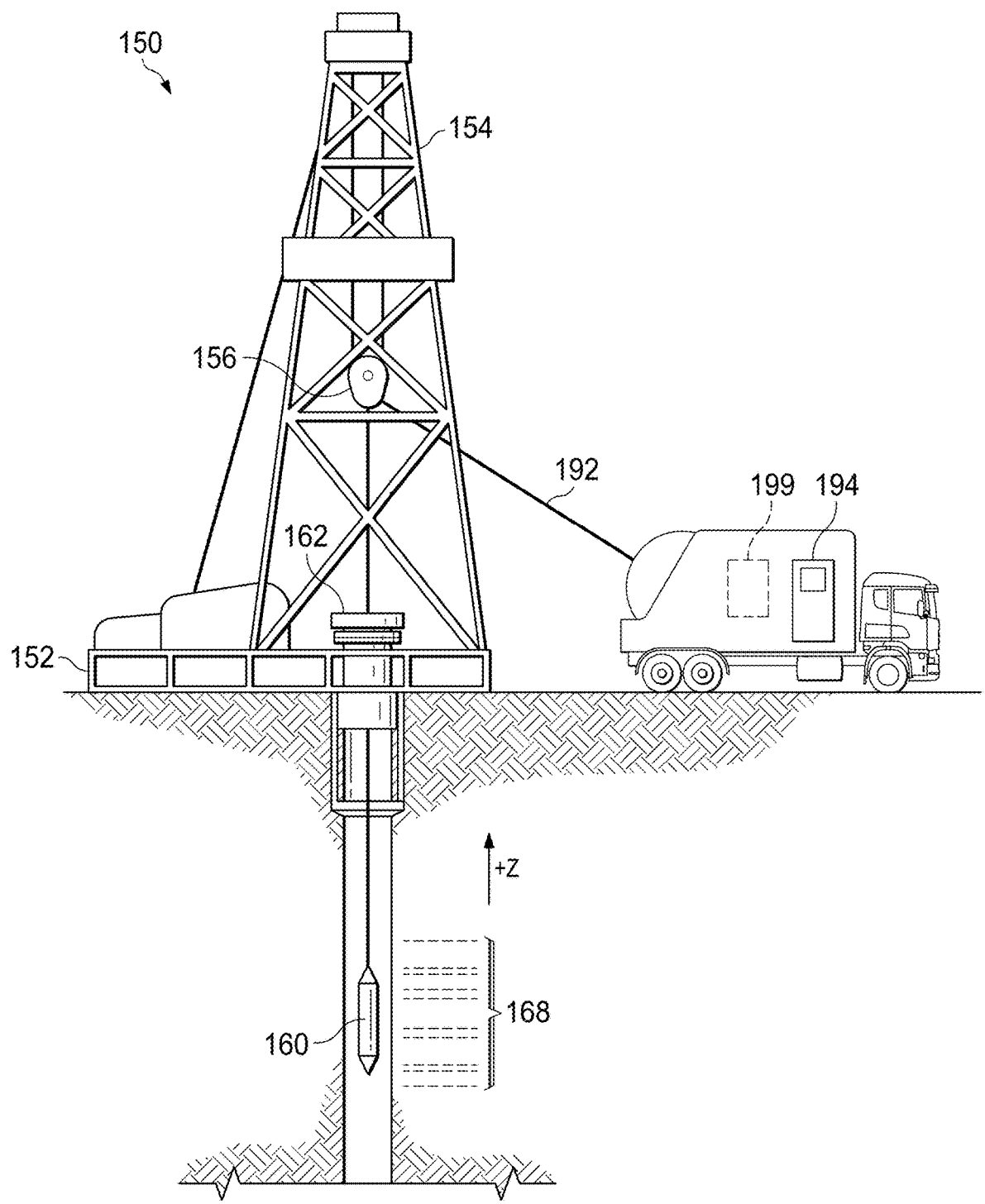
FIG. 1B illustrates a diagrammatic view of an example wireline logging wellbore operating environment.

FIG. 1B illustrates a diagrammatic view of a conveyance logging wellbore operating environment 150 in which the present disclosure may be implemented. As depicted in FIG. 1B, a hoist 156 may be included as a portion of a platform 152, such as that coupled to derrick 154, and used with a conveyance 192 to raise or lower equipment such as acoustic logging tool 160 through a wellhead 162 into or out of a borehole. A conveyance 192 may provide a communicative coupling between the acoustic logging tool 160 and a logging facility 194 at the surface. The conveyance 192 may include wires (one or more wires), slicklines, cables, or the like, as well as tubular conveyances such as coiled tubing, joint tubing, or other tubulars, and may include a downhole tractor. Additionally, power can be supplied via the conveyance 192 to meet power requirements of the tool. The acoustic logging tool 160 may have a local power supply, such as batteries, downhole generator and the like. When employing non-conductive cable, coiled tubing, pipe string, or downhole tractor, communication may be supported using, for example, wireless protocols (e.g. EM, acoustic, etc.), and/or measurements and logging data may be stored in local memory for subsequent retrieval. The logging facility 194 may include a computing device 199 capable of carrying out the methods and techniques of the present disclosure. In this manner, information about the formation 168 may be obtained by acoustic logging tool 160 and processed by a computing device, such as computing device 199. In some embodiments, computing device 199 is equipped to process the received information in substantially real-time, while in some embodiments, computing device 199 can be equipped to store the received information for processing at some subsequent time.

Figure 2:
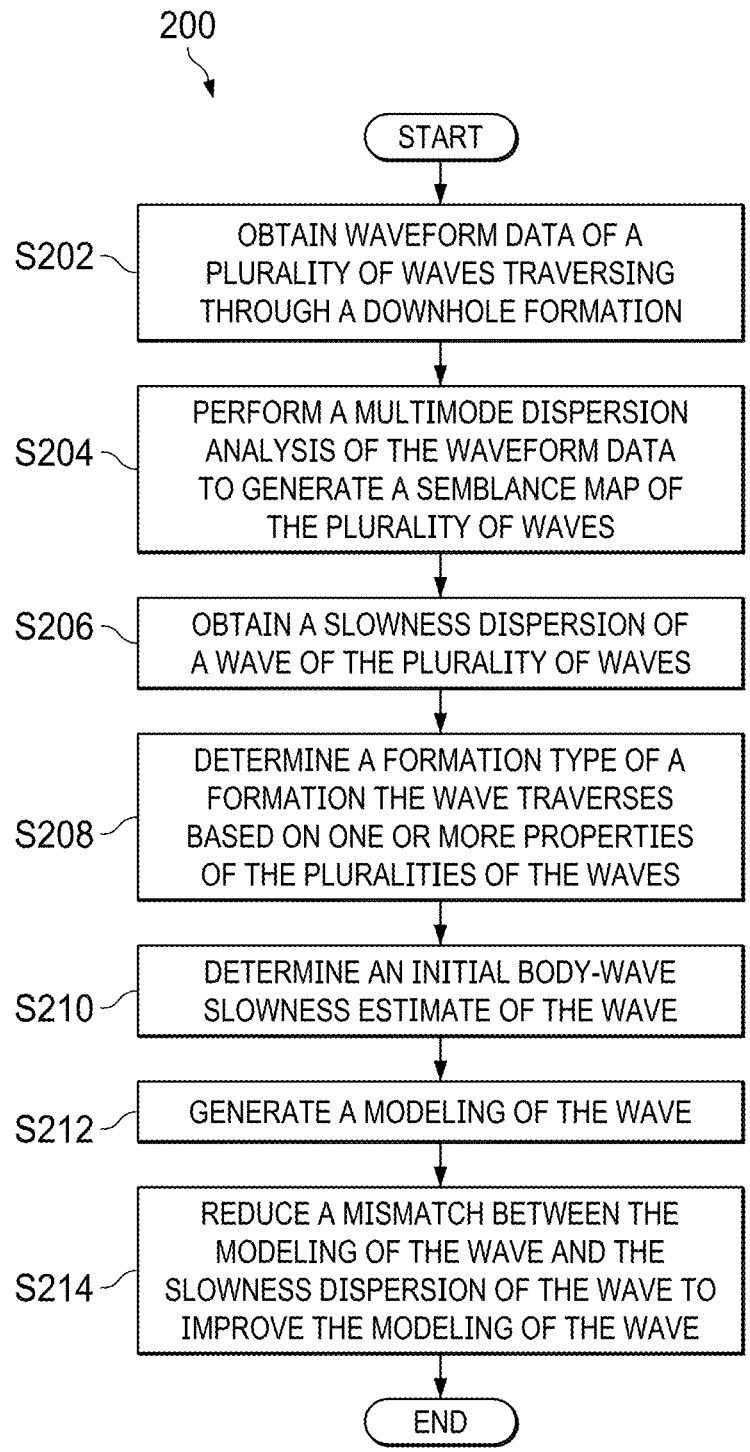
FIG. 2 is a process to estimate slowness of a multi-mode dispersion wave.

FIG. 2 is a flow chart illustrating a process 200 to estimate slowness of a multi-mode dispersion wave. Although the operations in process 200 are shown in a particular sequence, certain operations may be performed in different sequences or at the same time where feasible. At block S202, waveform data of a plurality of waves traversing are obtained through a downhole formation, wherein each wave of the plurality of orders of waves has a different threshold cutoff frequency. At block S204, a multimode dispersion analysis of the waveform data is performed to generate a semblance map of the plurality of waves. At block S206, a slowness dispersion of a wave of the plurality of waves is obtained. At block S208, a formation type of a formation the wave traverses is determined based on one or more properties of the plurality of the waves. At block S210, an initial body wave slowness estimate of the wave is determined. At block S212, a modeling of the wave is generated. At block S214 a mismatch between the modeling of the wave and the slowness dispersion of the wave is determined to improve the modeling of the wave.

Figure 3:
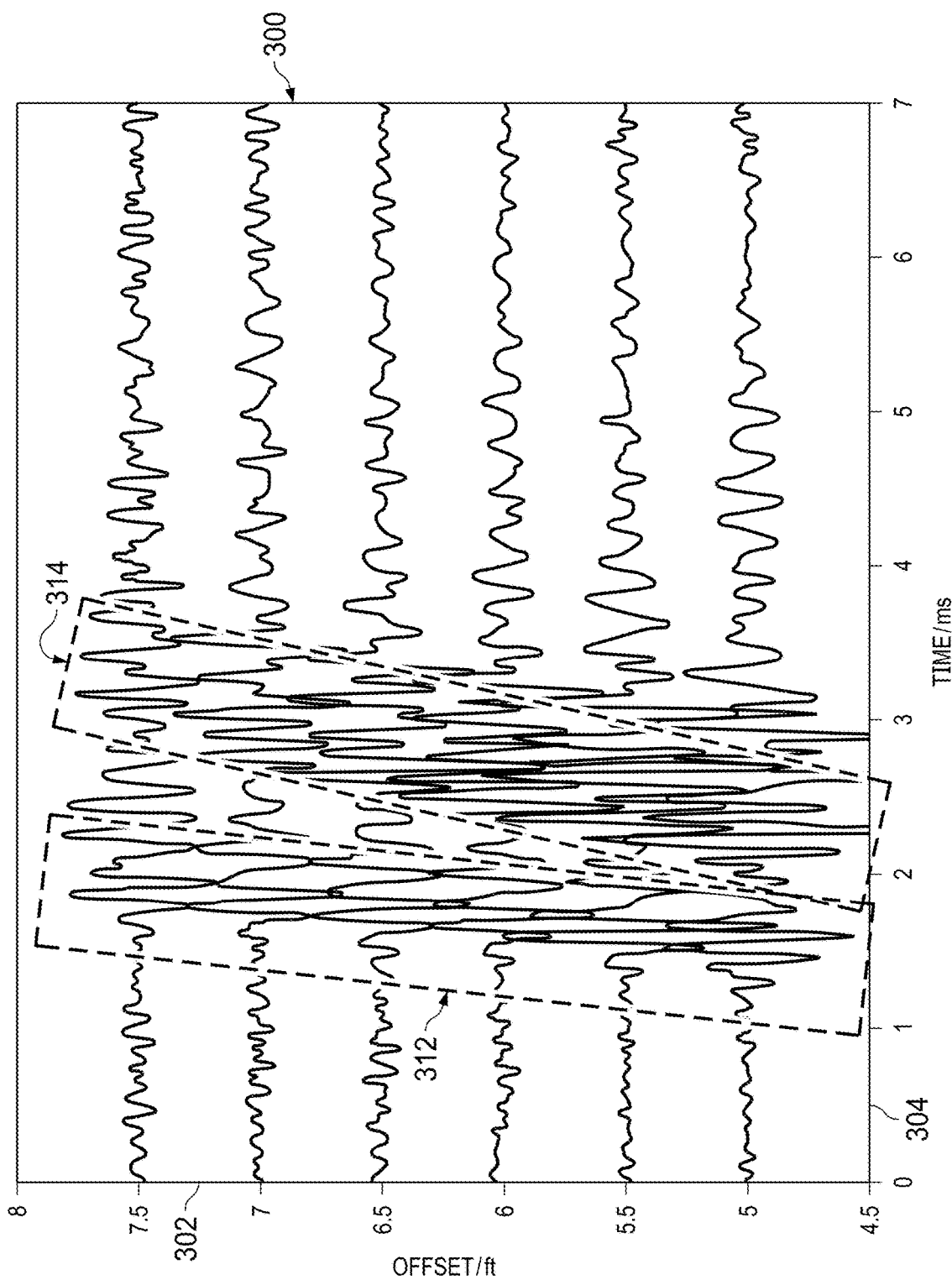
FIG. 3 is a plot of measured quadrupole waveforms measured by the logging while drilling tool of FIG. 1A.

FIG. 3 is a plot 300 of measured quadrupole waveforms measured by logging tool 126 of FIG. 1A. In the embodiment of FIG. 3, axis 302 represents offsets of receiver arrays of logging tool 126, and axis 304 represents time. In the embodiment of FIG. 3, a receiver array with offsets of approximately 5-7.5 feet is utilized to record the waveform data. In the embodiment of FIG. 3, the formation is a fast formation. The first wave package, which is shown in box 312 consists of the refracted shear and the high order screw waves, while the second wave package, which is shown in box 314, includes mostly the high-frequency portion of the first screw waves. A multi-mode dispersion analysis described herein is performed, and one or more slowness frequency semblance maps are generated. In some embodiments, multi-mode dispersion analysis includes a different phase frequency semblance (DPFS) processing for the first waves and a multi-frequency band different phase time semblance (DPTS) processing for the second waves.

Figure 4:
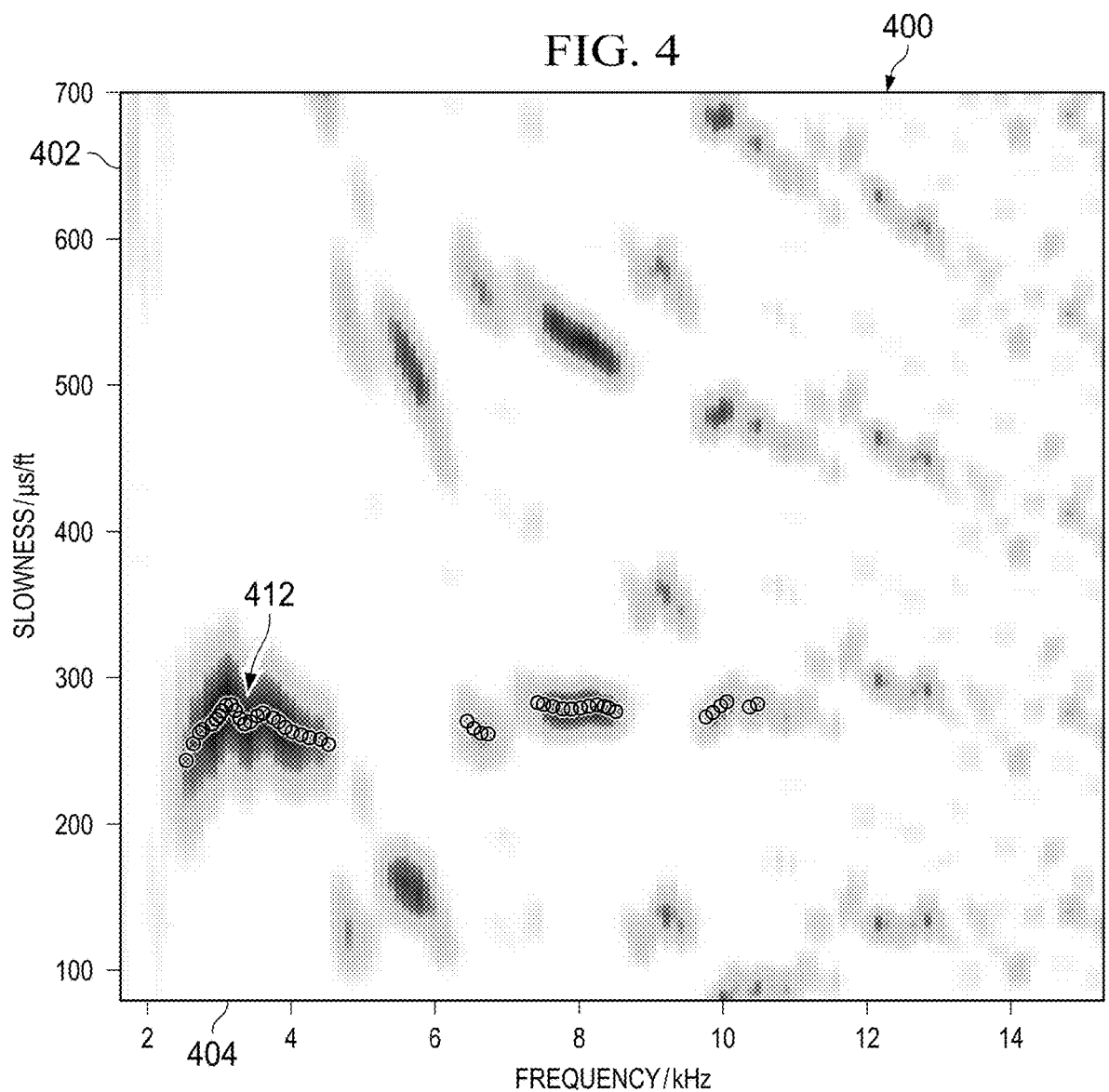
FIG. 4 is a dispersion map of first waves obtained through different phase frequency semblance processing.

FIG. 4 is a dispersion map 400 of first waves 412 obtained through different phase frequency semblance processing. In the embodiment of FIG. 4, axis 402 represents slowness of a wave, whereas axis 404 represents frequency of the wave. In some embodiments, DPFS presents the dominant mode for each frequency. In one or more of such embodiments, where the first screw waves, such as first waves 412 are the only mode at low frequencies, DPFS processing is utilized to extract the dispersion properties of the first screw waves.

Figure 5:
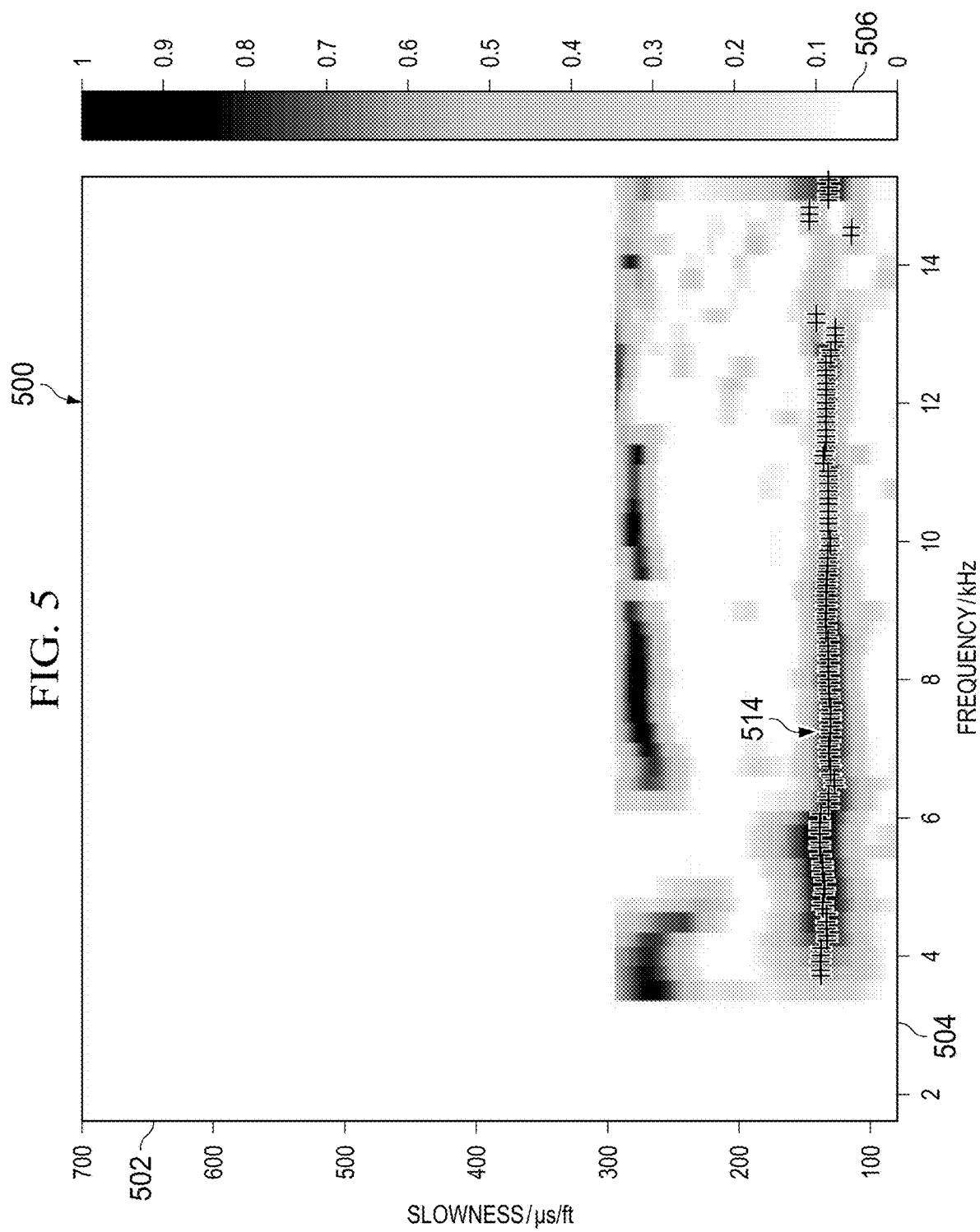
FIG. 5 is a dispersion map of second waves obtained through multi-frequency band different phase time semblance processing.

FIG. 5 is a dispersion map 500 of second waves 514 obtained through multi-frequency band different phase time semblance processing. In the embodiment of FIG. 5, axis 502 represents slowness of a wave, whereas axis 504 represents frequency of the wave. Further, block 506 represents the likelihood of a mode of a wave at a frequency, where the likelihood ranges from 0-1. In the embodiment of FIG. 5, a list of narrow-band filters are utilized to filter raw waveforms, and the filtered data are processed using the DPTS method. The semblance values obtained through DPTS processing are projected to slowness vs. frequency domain to generate a final semblance map, such as map 500. In some embodiments, DPFT and DPTS processing are both utilized to generate a semblance map of multiple orders of waves.

Figure 6:
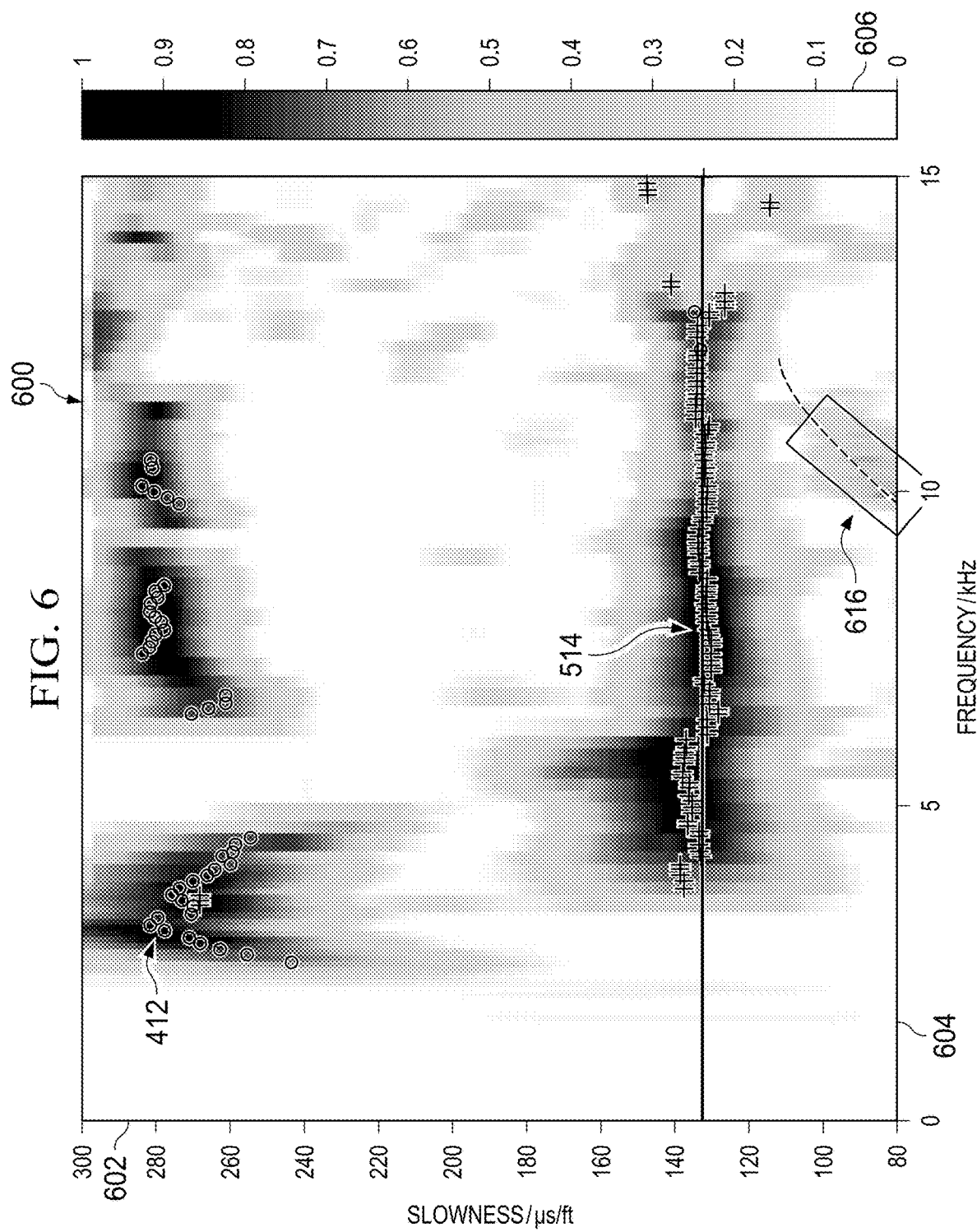
FIG. 6 is a dispersion map containing the combined dispersion analysis results of the quadrupole waveforms illustrated in FIG. 3.

In that regard, FIG. 6 is a dispersion map 600 containing the combined dispersion analysis results of waveforms illustrated in FIG. 3. In the embodiment of FIG. 6, axis 602 represents slowness of a wave, whereas axis 604 represents frequency of the wave. Further, block 606 represents the likelihood of a mode of a wave at a frequency, where the likelihood ranges from 0-1. Further first waves 412 of FIG. 4 and second waves 514 of FIG. 5 are also plotted together with tool waves 616.

A determination of formation type of the formation (e.g., whether the formation shear wave speed is faster or slower than the mud compressional speed), is made to classify the mode category in multi-mode analysis operations performed herein. In some embodiments, where the existing wave types for a fast and a slow formation are different, the foregoing operation is performed to observe and analyze all wave forms traveling through the formation. For example, only the first screw waves, several higher-order quadrupole waves and the refracted shear waves are observable for a fast formation with a quadrupole source, whereas only the first screw waves and the leaky-P waves are observable for a slow formation with a quadrupole source. In some embodiments, the formation types are estimated by comparing the results of a number of slowness estimated from multi-slowness-density logs with the mud slowness, where the slowness density log refers to a curve indicating the slowness intensity or distribution range for a dispersion curve.

In some embodiments, the slowness density log can be calculated from the dispersion and semblance curves by the following equation:

$$SDL(s)=\Sigma semb(s'), s' \in (s-ds, s+ds),$$ Equation 1 where s represents slowness, semb (s') represents semblance value of the dispersion response, s' represents the dispersion curve, ds denotes the slowness width for the statistics of slowness values, and SDL(s) denotes the slowness density log that indicates the slowness intensity of the dispersion at each slowness grid point.

In some embodiments, tool waves, such as tool waves 616 of FIG. 6 are removed from dispersion map 600. In some embodiments, after the tool waves are removed, the remaining tool waves are analyzed to determine the formation type of the formation. For example, the dispersion analysis results for first waves 412 of FIG. 4 and the second waves 514 of FIG. 5 are employed for determining the formation types. In one or more of such embodiments, the dispersion curves of first waves 412 are extracted by the peaks (as noted by circles shown in FIG. 2). A slowness density log is then generated based on the following equation:

$$SDL_{1st}(s)=\Sigma semb(s_{1st}(f)), s_{1st}(f)' \in (s-ds, s+ds),$$ Equation 2 where $SDL_{1st}(s)$ represents the slowness density log for the first waves, and $s_{1st}$ represents the dispersion curve of the first waves. In some embodiments, a reference screw wave slowness is extracted by the global maximum or the leading peak of $SDL_{1st}$, and is utilized to determine the formation type.

Next, the dispersion of the first waves, such as first waves 412 of FIG. 4, are utilized for predicting the body wave slowness by a dispersion correction processing at each frequency by applying the following equation:

$$\min_s \{|s_{1st}(f) - D(s_{shear}^{1st}, f)|\},$$ Equation 3 where $D(s_{shear}^{1st}, f)$ represents model dispersion, min represents an optimization processing to minimize the objective function. Equation 3 is applied at each frequency, thus the predicted shear slowness by Equation 3 will be a slowness curve vs. frequency, $s_{shear}^{1st}(f)$, in the form of a dispersion curve.

Figure 7:
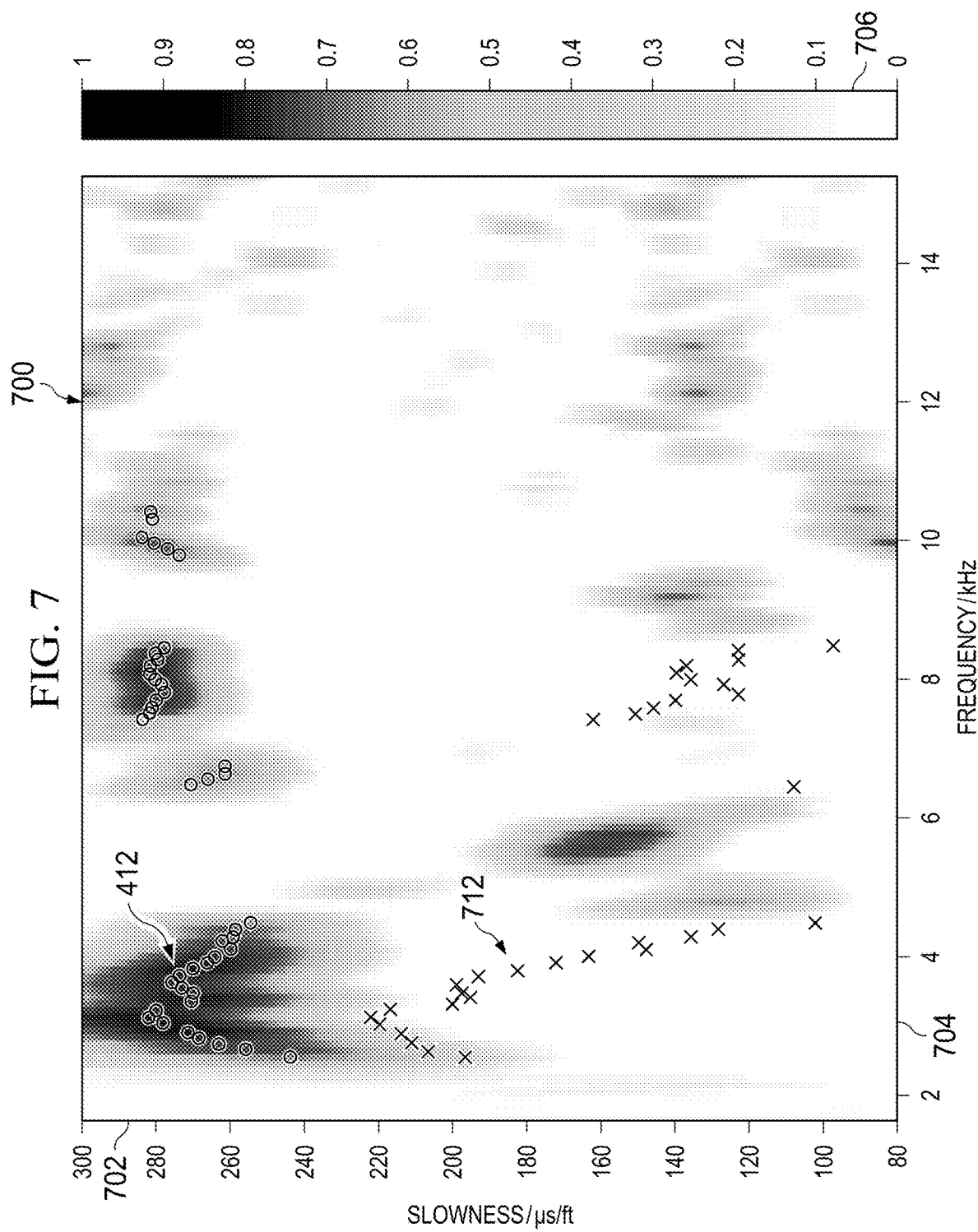
FIG. 7 is a dispersion map similar to the dispersion map of FIG. 4, and also illustrating predicted shear waves from the first waves of FIG. 4.

FIG. 7 is a dispersion map 700 similar to the dispersion map 400 of FIG. 4, and also illustrating predicted shear waves 712 from first waves 412 of FIG. 4. More particularly, FIG. 7 illustrates an example of the predicted shear wave slowness from the slowness of first wave 412 of FIG. 4. In the embodiment of FIG. 7, axis 702 represents slowness of a wave, whereas axis 704 represents frequency of the wave. Further, block 706 represents the likelihood of a mode of a wave at a frequency, where the likelihood ranges from 0-1. As illustrated in FIG. 7, the predicted shear wave slowness is lower than the screw wave slowness of first wave 412. In some embodiments, the predicted shear wave slowness is lower than the screw wave slowness of first wave 412 due to the dispersion correction procedure of Equation 3.

Next, a slowness density log is also calculated from the predicted shear wave slowness, for example, by the following equation:

$$SDL_{1st}^{shear}(s) = \Sigma semb(S_{shear}^{1st}(f)), S_{shear}^{1st}(f)' \in (s-ds, s+ds),\qquad\text{Equation 4}$$

where $SDL_{1st}^{shear}(s)$ represents the slowness density log for the first waves and semb( ) represents semblance value at the dispersion. In some embodiments, a reference predicted shear wave slowness is extracted by taking the global maximum or the leading peak of the slowness density log, and is subsequently utilized to determine the formation type.

Figure 8A:
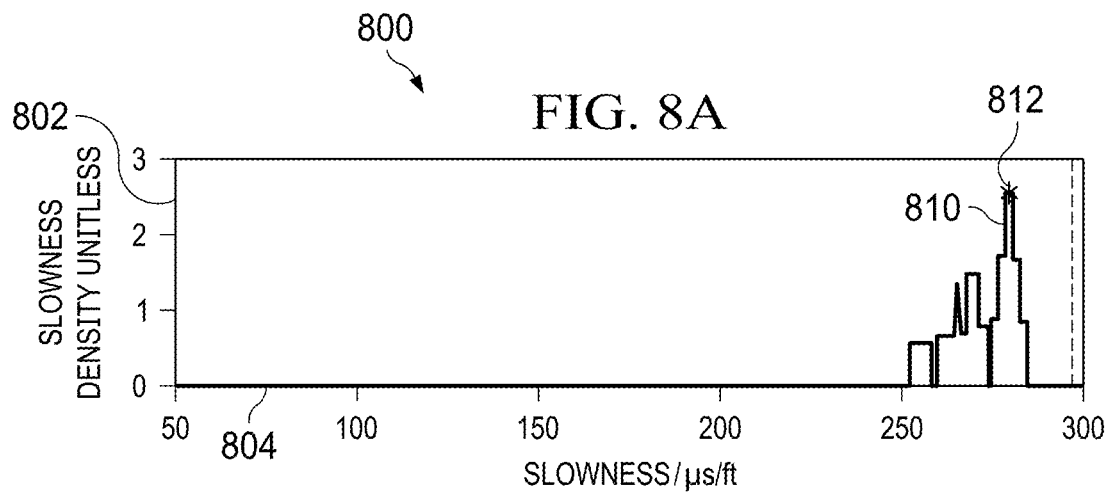
FIG. 8A is a graph of a slowness density log of the first waves of FIG. 4.
Figure 8B:
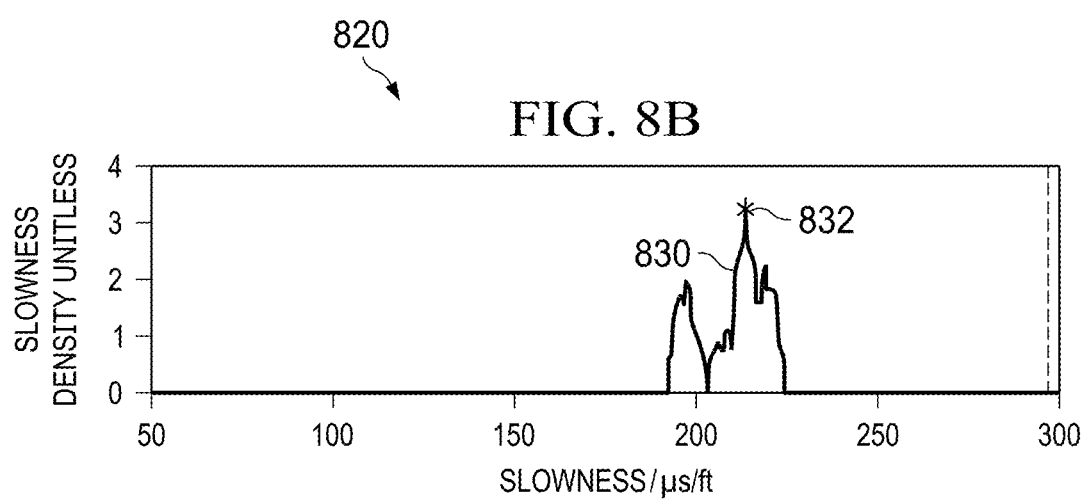
FIG. 8B is a graph of a slowness density log of the predicted shear wave slowness of the first wave of FIG. 7.

FIG. 8A is a graph 800 of a slowness density log 810 of first waves 412 of FIG. 4. In the embodiment of FIG. 8A, axis 802 represents slowness density of a wave, whereas axis 804 represents slowness of the wave. Further, point 812 represents the reference screw wave slowness of first waves 412, where the reference screw wave slowness of first wave 412 is the maximum of the slowness density log 810. FIG. 8B is a graph 820 of a slowness density log 830 of predicted shear wave slowness of predicted shear waves 712 of FIG. 7. Further, point 832 represents the predicted shear wave slowness of predicted shear waves 712, where the predicted shear wave slowness is the maximum of the slowness density log 810.

In some embodiments the slowness density log for the first screw waves and the predicted shear waves are combined to obtain a combined slowness density log for the first waves, where the combined slowness density log for the first waves is expressed by the following equation:

$$SDL_{1st}^{combined}(s) = \alpha SDL_{1st}(s) + SDL_{1st}^{shear}(s),\qquad\text{Equation 5}$$

where $SDL_{1st}^{combined}(s)$ denotes the combined slowness density log, $\alpha$ is a parameter to balance the contribution weight of the screw waves and predicted shear waves in the final combined slowness density log. Moreover, extracting the slowness associated with the leading edge of the combined slowness density log yields an edge slowness of the shear waves which, in some embodiments, is untied as an initial guess candidate of a final dispersion match analysis.

Figure 8C:
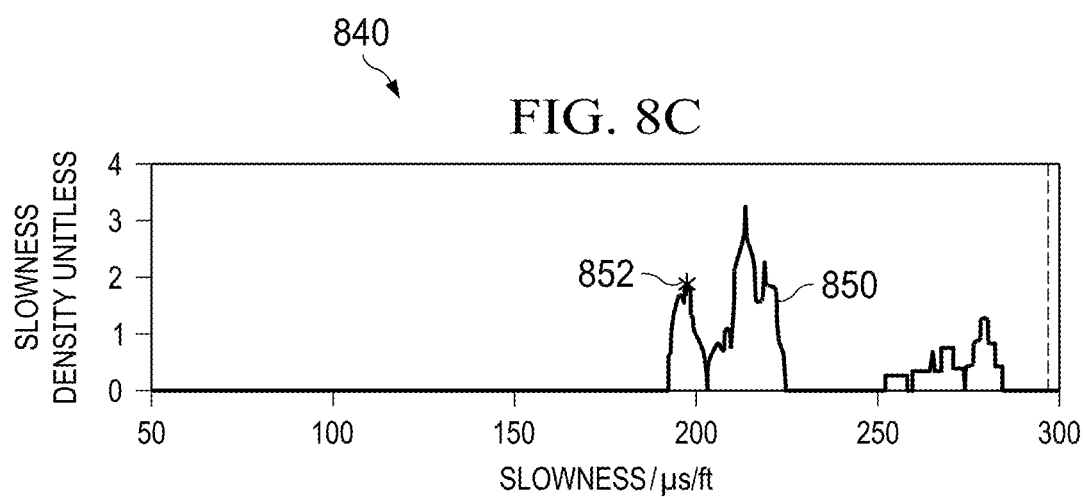
FIG. 8C is a graph of a combined slowness density log of the first waves and the predicted shear wave.

In that regard, FIG. 8C is a graph 840 of a combined slowness density log 850 of slowness density log 810 of FIG. 8A and slowness density log 830 of FIG. 8B. Further, point 852 represents an extracted edge slowness.

In some embodiments, one or more operations described herein are performed on second waves 514 of FIG. 5 to obtain a slowness density log for the second waves. In some embodiments, second waves 514 consist of contributions from both second screw waves and refracted shear waves. In one or more of such embodiments, second screw waves 514 also include a long-lasting weak dispersive portion that approaches the formation shear wave slowness, and is mixed with the refracted shear waves in both the time and frequency domain. In one or more of such embodiments, only the weakly dispersive portion of the high-order screw waves are utilized, and the higher-order screw waves and the refracted shear waves are considered as a whole during processing. As referred to herein, a higher or high order screw wave is a wave having an order that is greater than one. In one or more of such embodiments, where there are two orders of screw waves (a first order and a second order), the second order screw wave is a higher or high order screw wave relative to the first order screw wave. Extracting the slowness associated with the leading peaks for each frequency yields a dispersive curve (e.g., a slowness vs. frequency curve) for the second waves. For example, the plus symbols in FIG. 6 indicate the extracted dispersion curve for second waves 514. In one or more of such embodiments, a slowness density log is obtained from the following equation:

$$SDL_{2nd-f}(s) = \Sigma semb(s_{2nd}(f)), s_{2nd}(f)), s_{2nd}(f)' \in (s-ds, s+ds),\qquad\text{Equation 6}$$

where $s_{2nd}(f)$ denotes the dispersion curve of the second waves, $SDL_{2nd-f}$ represents the slowness density log of the second waves from the frequency-domain dispersions.

In some embodiments, where the second waves are weakly dispersive or nondispersive, the slowness density log in Equation 6 is combined with the full- or broadband-frequency time-domain processing to gain more stability. In some embodiments, the full- or broadband-frequency time-domain processing presents modes with a relatively short wavelet which reduces interferences between modes having different arrival times, and fills one or more gaps that the frequency-domain processing sometimes fails to separate. In some embodiments, Equation 6 is combined with selected results of a time domain processing, and Equation 6 is modified to the following equations:

$$SDL_{2nd-t}(s) = semb(s_{2nd-t}), s_{2nd-t} \in (s-ds, s+ds),\qquad(7)$$

$$SDL_{2nd}(s) = \beta SDL_{2nd-t}(s) + SDL_{2nd-f}(s),\qquad(8)$$

where $s_{2nd}(f)$ denotes the slowness estimates of the second waves with a time-domain processing, $SDL_{2nd-t}(s)$ represents the slowness density log of the peaks extracted from the time domain processing, $SDL_{2nd}(s)$ denotes the final slowness density, $\beta$ represents a factor that balances the contributions of $SDL_{2nd-t}$ and $SDL_{2nd-f}$.

Figure 8D:
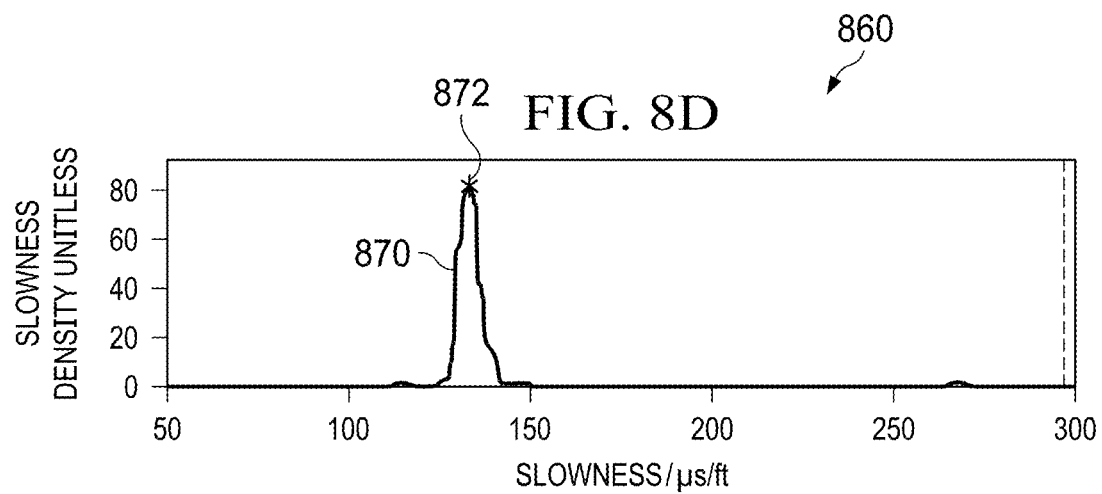
FIG. 8D is a graph of a final slowness density log of the second waves of FIG. 5.

In some embodiments, a maximum value of the slowness density log is extracted and utilized as an estimate of the second wave slowness. FIG. 8D is a graph 860 of a final slowness density log 870 of the second waves 514 of FIG. 5. A single high and narrow peak of final slowness density log 870 is represented by a point 872, at or near which, the slowness of second waves 514 is associated with the maximum density of second waves 514. In one or more of such embodiments, the slowness of second waves 514 as determined in FIG. 8D is utilized as an initial estimate of the slowness of second waves 514 for a final inversion operation.

Figure 8E:
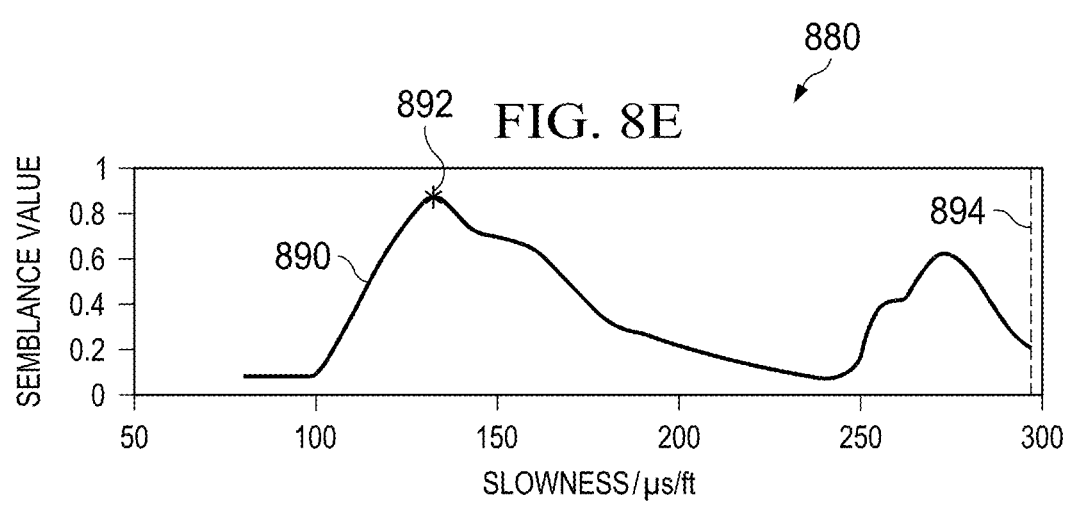
FIG. 8E is a graph of a time-slowness semblance log of the second waves of FIG. 5.

In some embodiments, values of first screw slowness from $SDL_{1st}(s)$, the predicted shear wave slowness from $SDL_{1st}^{shear}(s)$, the edge slowness from $SDL_{1st}^{combined}(s)$ and the second wave slowness from $SDL_{2nd}(s)$, are compared with the mud compressional-wave slowness to determine a formation type (e.g., if the formation shear wave slowness is higher or lower than the mud slowness, whether the formation is a slow or a fast formation, etc.). In one or more of such embodiments, where all the four pre-estimated slowness values are lower than the mud slowness, the formation is identified as a fast formation. In one or more of such embodiments, where one or more of the four pre-estimated slowness values is not lower than the mud slowness, the formation might be recognized as a slow formation. FIG. 8E is a graph 880 of a time-slowness semblance log 890 of second waves 514 of FIG. 5. As illustrated by FIG. 8E, the mud slowness is 295 □s/ft and is indicated by dash line 894. Further, the slowness values of the first screw slowness as indicated by point 812 of 8A, the predicted shear wave slowness as indicated by point 832 of FIG. 8B, the edge slowness as indicated by point 852, and the slowness value of the second waves as indicated by point 852, are all lower than mud slowness, which indicates that the formation is a fast formation. Further, point 892 represents the second-wave slowness extracted from the time-slowness semblance 890.

Figure 9:
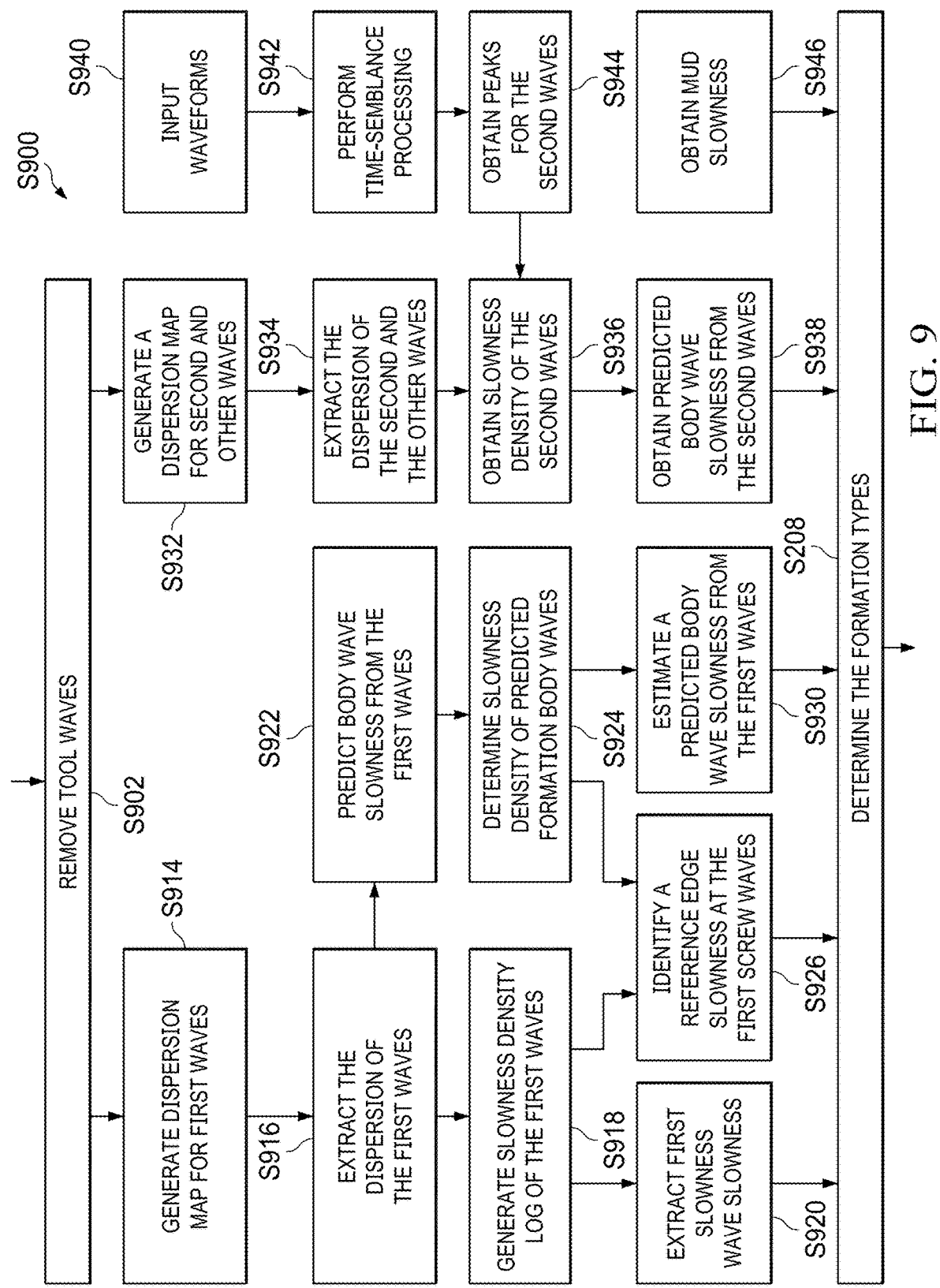
FIG. 9 is a flow chart illustrating a process to determine the formation type of a formation.

FIG. 9 is a flow chart illustrating a process 900 to determine the formation type of a formation. Although the operations in process 900 are shown in a particular sequence, certain operations may be performed in different sequences or at the same time where feasible. Further, in some embodiments, only certain operations of process 900 are performed at a time.

At block S902, tool waves are removed from a dispersion map of waves traveling through a formation. At block S914, a dispersion map for the first waves, such as first waves 412 of FIG. 4 is generated. At block S916 the dispersion of the first waves is extracted. At block S918, a slowness density log of the first waves is generated, and at block S920, a reference first screw wave slowness is extracted based on the slowness density log.

The process optionally also continues from block S916 to S922, where a formation body wave slowness is predicted based on the dispersion of the first waves. At block S924, a slowness density log for the predicted formation body wave slowness is determined. In some embodiments, the slowness of the screw wave is determined by the maximum or the leading peak on the screw wave slowness density. At block S926, the slowness density log of the first waves and the predicted formation body wave slowness are combined to generate an integrated slowness density log, and the leading peak of the integrated slowness density log is utilized to identify a reference edge slowness, such as the edge slowness at the first screw waves. Further, at block S930, a predicted body wave is estimated based on the maximum of the leading peak on the slowness density log.

Process 900 concurrently while performing the foregoing processes on the first waves, or after performing the foregoing processes on the first waves, proceeds to block S932. In some embodiments, second waves and high order waves consist of a long-lasting weak dispersive portion that approaches the body wave slowness mixed with refracted body waves in both the time and frequency domain. In one or more of such embodiments, a combined time- and frequency-domain processing are utilized to identify the potential slowness asymptotic value of the second waves. At block S932, a dispersion map for the second waves, such as second waves 514 of FIG. 5, are generated. At block S934, a dispersion of the second waves is extracted in a frequency domain processing. In some embodiments, at block S940, waveforms of the second and higher order waves are inputted, and at block S942, a time-domain semblance processing of wave data of the second waves is performed and at block S944 peaks for the second waves are obtained from the time-domain semblance of the second waves. In some embodiments, operations illustrated in blocks S934 and S942 are performed concurrently. In some embodiments, operations illustrated in blocks S934 and S942 are performed one after the other. At block S936, the time-domain slowness peaks and the frequency-domain dispersion are combined to calculate a slowness density log of the second waves. At block S938, the maximum or the leading peak of the slowness density log is determined and designated as a predicted body wave slowness of the second waves, and the predicted body wave slowness of the second waves is utilized to determine the formation type of the formation.

In the embodiment of FIG. 9, the mud slowness is determined at block S946 and is utilized to determine the formation type of the formation. At block S208, the formation type is determined based on the analysis of the first wave slowness, edge slowness, predicted body wave slowness from the first waves, a predicted body wave slowness from the second waves and the input mud slowness. For example, if all of the four estimated slownesses are lower than the mud slowness, then the formation is identified as a fast formation, otherwise, the formation is designated as a slow formation.

Figure 10:
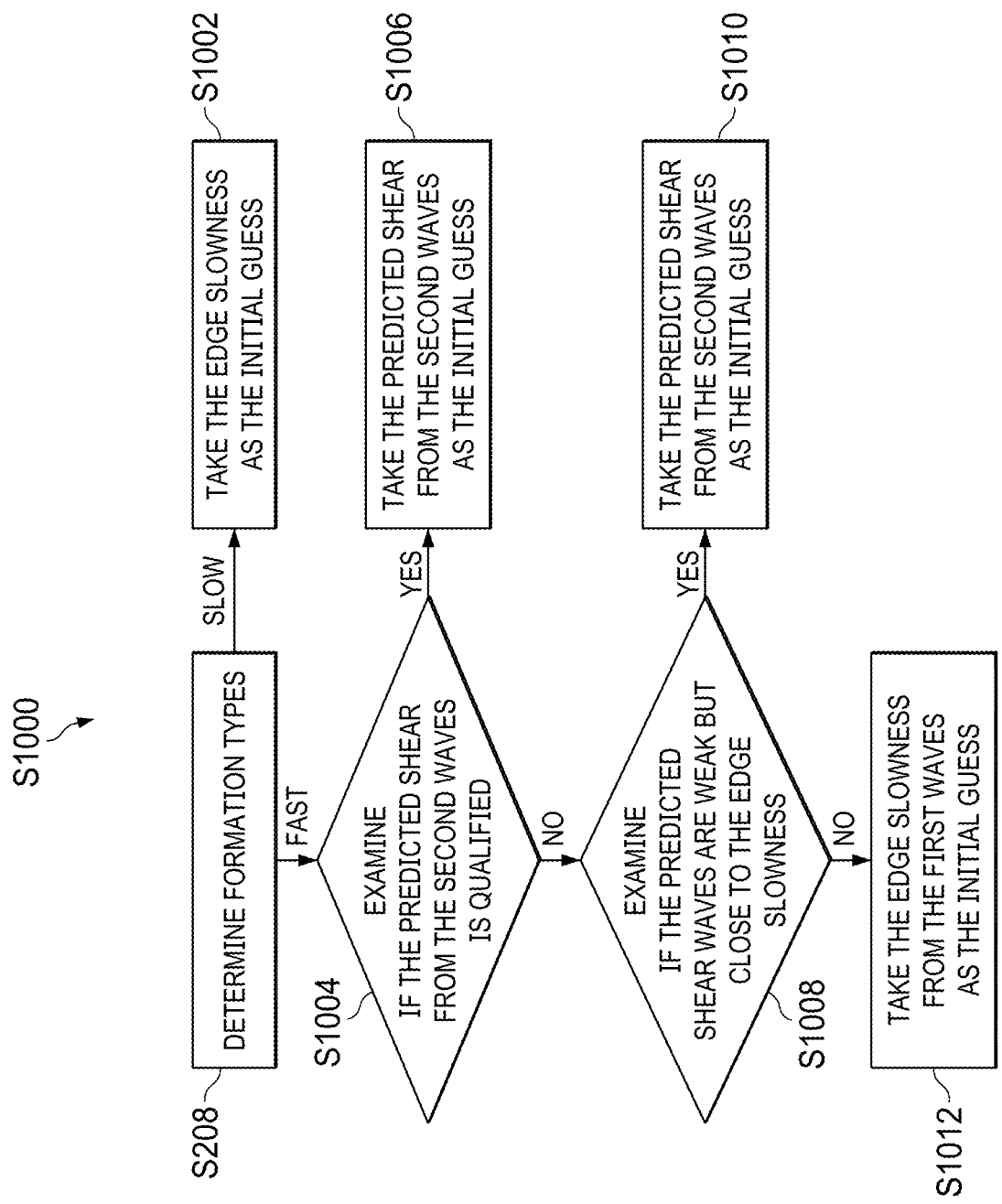
FIG. 10 is a flow chart illustrating a process to determine an initial guess of a body wave slowness.

FIG. 10 is a flowchart illustrating a process 1000 to determine an initial guess of a body wave slowness. Although the operations in process 1000 are shown in a particular sequence, certain operations may be performed in different sequences or at the same time where feasible. Further, in some embodiments, only certain operations of process 1000 are performed at a time.

At block S208, the formation type of a formation is determined. Operations performed to determine the formation type of a formation are described herein and are illustrated in at least FIG. 9. At block S208, if the formation is identified as a slow formation, then process proceeds to block S1002, and the edge slowness is designated as the initial guess of the body wave slowness. Alternatively, at block S208, if the formation is identified as a fast formation, the process proceeds to block S1004, and the shear slowness peaks from the second waves examined to determine whether the shear slowness peaks are strongly coherent and continuous in the frequency axis. The process proceeds to block S1006 if the shear slowness peaks are determined to be strongly coherent and continuous in the frequency axis, and the slowness from the shear waves is designated as the initial guess of the body wave slowness. Alternatively, at block S1004, if the shear slowness peaks are not determined to be strongly coherent and continuous in the frequency axis, the process proceeds to block S1008, and an analysis of whether the predicted shear waves are weak but are close to the edge slowness is made. At block S1008, in response to a determination that the predicted shear waves are weak but are close to the edge slowness, the process proceeds to block S1010, and the predicted shear from the second waves is designated as the initial guess of the body wave slowness. Alternatively, at block S1008, and in response to a determination that the predicted shear waves are not close to the edge slowness, the process proceeds to block S1012, and the edge slowness from the first waves is designated as the initial guess of the body wave slowness.

For example, in the embodiment of FIGS. 8A-8E the formation is a fast formation, the predicted shear slowness from the second waves is qualified (e.g. associated with a high and narrow peak in the slowness density log), and the shear slowness from the second waves are utilized as an initial guess in the following inversion procedure.

An improvement or optimization processing for final body wave slowness is then performed by reducing the misfit between the measurements and the modeling data. The measurements are extracted by the step of multi-mode dispersion analysis. In some embodiments, the model data for the first and second waves are an exact model. In one or more of such embodiments, a forward modeling calculation is performed to generate a library including all possible responses of the waves to different inputs. In some embodiments, the model data for the first and the second waves are a simplified model. In one or more of such embodiments, adjustable or data-driven parameters are introduced to account for the errors caused by unknown inputs. For example, the following equation is utilized for the first waves, $$D(s_{shear},a,b,f)=bD(s_{shear},1,1,a*f)+(1-b)s_{shear} \quad \text{Equation 9}$$

where $D(s_{shear},1,1,f)$, is calculated with a set of standard borehole parameters with a proper forward modeling method. Taking shear slowness value of 120 us/ft as an example, all potential dispersion responses are generated by changing variable a and b as shown in FIG. 11.

Figure 11:
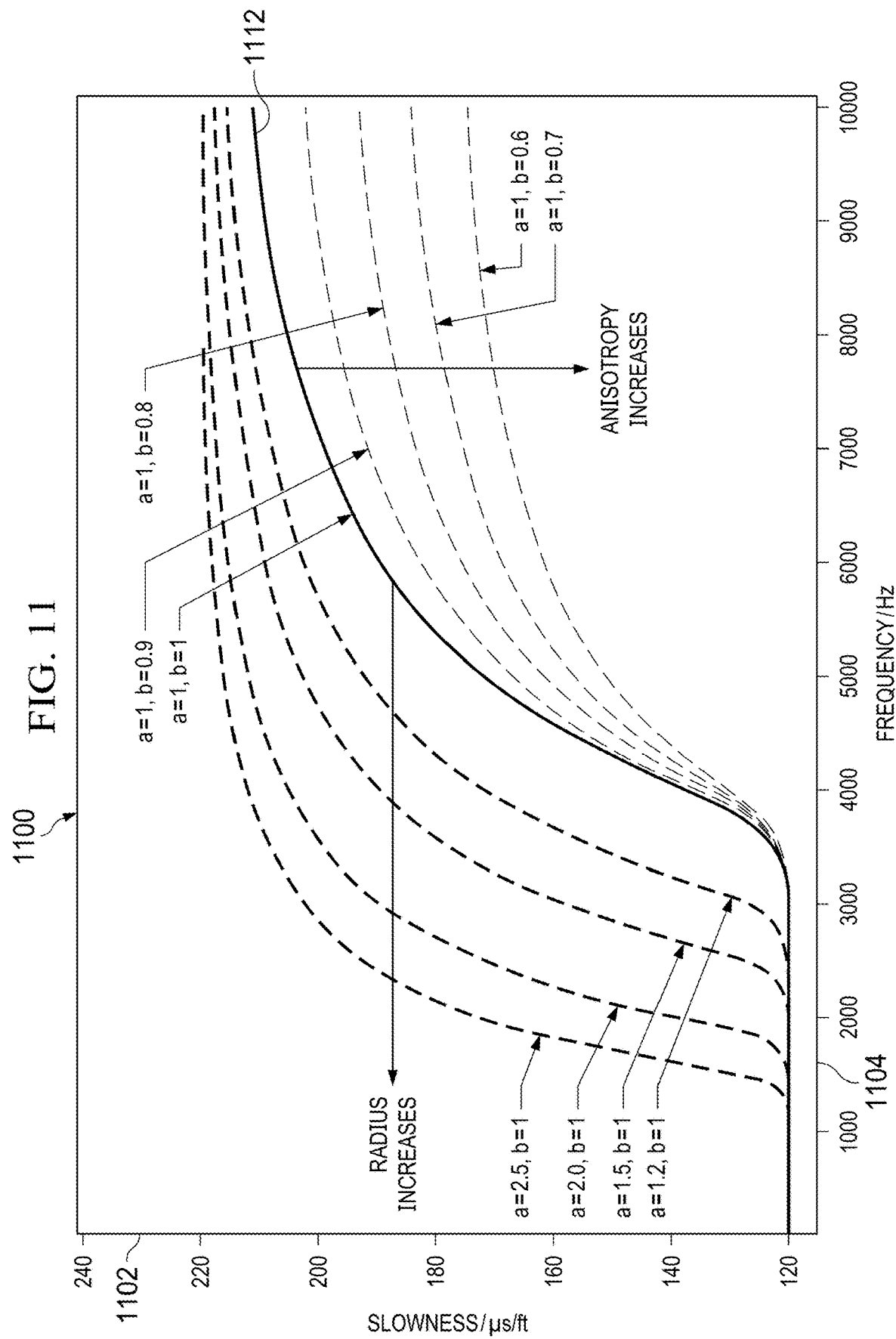
FIG. 11 is an illustration of a slowness-frequency graph of a simplified model for the first waves presenting the effecting of adjusting different model parameters for modeling dispersion responses.

In that regard, FIG. 11 illustrates a slowness-frequency graph 1100 of a simplified model for the first waves presenting the effecting of adjusting different model parameters for modeling dispersion responses. In the embodiment of FIG. 11, axis 1102 represents the slowness of a wave, whereas axis 1104 represents the frequency of a wave, Line 1112 shows the dispersion response with a and b set to 1. Changing a to a larger number will shift the dispersion response to the lower frequency and changing b to smaller than one will lower the high frequency asymptote. FIG. 11 illustrates how to utilize a and b to account for the influence of unknown parameters. For real-time processing, the full simplified dispersion responses are generated for all types of situations from a fundamental dispersion library using equation 9.

In some embodiments, Equation 9 is also utilized to generate a simplified model for the second waves. In some embodiments, where the second waves often consist of both refracted waves and the high order waves whose low-frequency portion is weak dispersive and close to refracted waves, the non-dispersive or weak dispersive portion of the second waves are utilized to obtain a formation body wave prediction, and a non-dispersive wave dispersion model is utilized to approach the second wave slowness. In some embodiments, the wave slowness does not change with the frequency due to a non-dispersion assumption. In one or more of such embodiments, adaptive weights are generated based on the dispersion curve or the slowness density log to suppress the dispersive data of the second waves, such as by applying the following equation:

$$Weight_2(f)=SDL_{2nd}(s_{2nd}(f))^\theta, \quad \text{Equation 10}$$

where $Weight_2(f)$ represents the weights for the second waves, $s_{2nd}(f)$ denotes the second wave dispersion, $\theta$ represents a factor to control the weights for different portions of the data.

Figure 12:
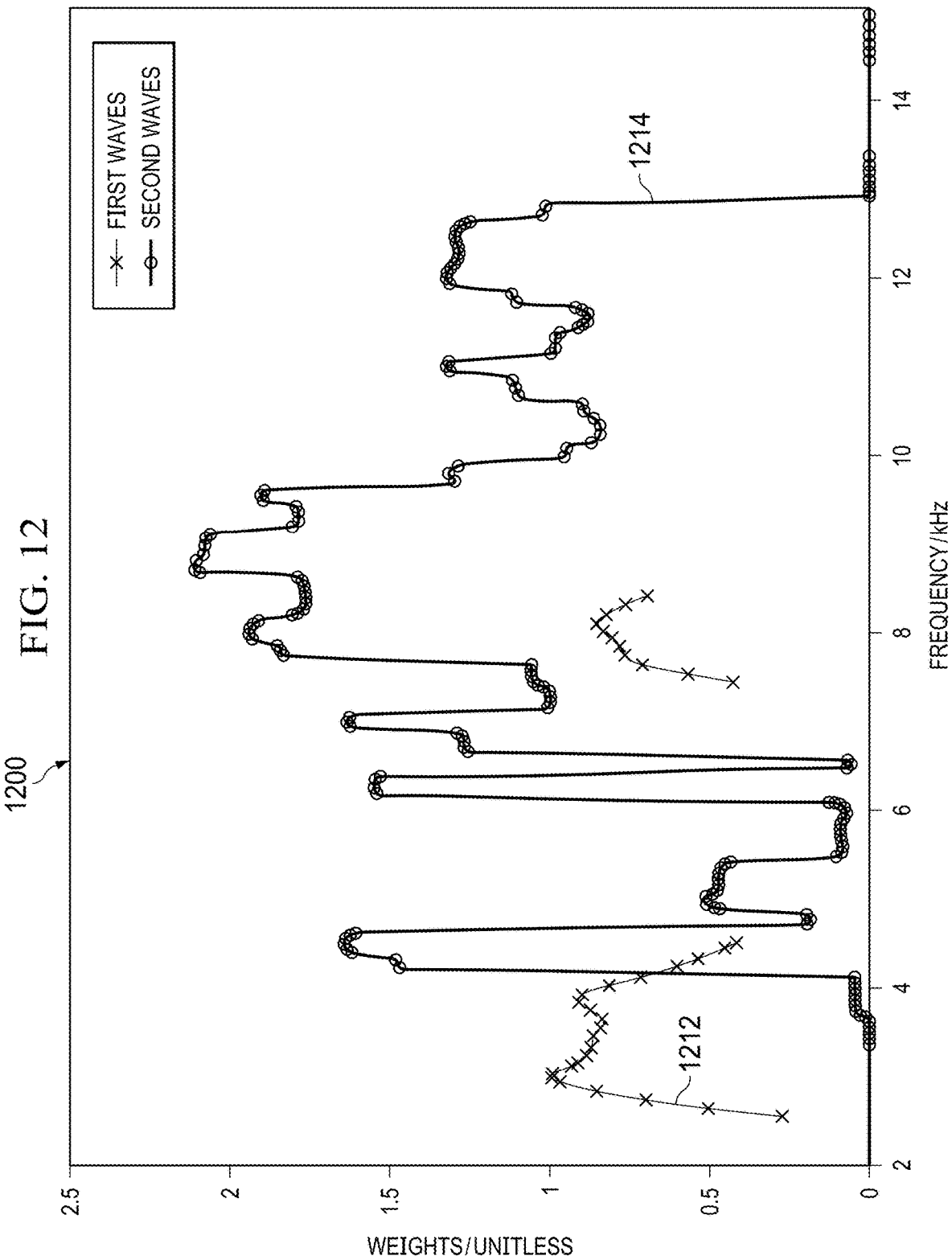
FIG. 12 illustrates a graph of weights generated for the first waves and the second waves.

In some embodiments, the weights for the first waves are calculated from both the slowness density log and the amplitude information of the data, for example, by applying the following equation:

$$Weight_1(f)=[SDL_{1st}(s_{1st}(f))]*[AMP(f)]^{\theta_2} \quad \text{Equation 11}$$

where $Weight_1(f)$ represents the weights for the first waves, $\theta_1$ and $\theta_2$ are parameters to adjust the contribution of the two weights upon frequencies, and AMP(f) is the amplitude information by means of frequency. For example, FIG. 12 illustrates a graph 1200 of weights generated for first waves 1212 and second waves 1214. In the embodiment of FIG. 12, the non-dispersive portions of second waves 1214 are assigned to higher weights, as a non-dispersive model is defined and utilized to approach the measurements.

In some embodiments, an object function is utilized to calculate the misfit between the modeling and the measurements, for example, by applying the following equation:

$$O(s_{shear}, a, b) = \sum_{mode=1}^{n} \sum_{f} Weight_{mode}(f)|D_{mode}(s_{shear}, a, b, f) - S_{mode}(f)|^2 \quad \text{Equation 12}$$

where $O(s_{shear},a,b)$ represents the objective function, mode represents the mode number, $Weight_{mode}(f)$ denotes the weights, $D_{mode}(s_{shear},a,b,f)$ denotes the modeling data, $S_{mode}(f)$ describes the measurements. Moreover, if the second waves are assumed to be nondispersive, then Equation 12 is rewritten as the following:

$$O(s_{shear}, a, b) = \sum_{f} Weight_1(f)|D_1(s_{shear}, a, b, f) - S_1(f)|^2 + \sum_{f} Weight_2(f)|s_{shear} - S_2(f)|^2 \quad \text{Equation 13}$$

Further, the initial guess of the body slowness is utilized to generate an initial guess of the modal dispersion and the adjustable parameter a and b, by the following:

$$O(a, b) = \sum_{f} Weight_1(f)|D_1(s_{shear,IG}, a, b, f) - S_1(f)|^2 + \sum_{f} Weight_2(f)|s_{shear,IG} - S_2(f)|^2 \quad \text{Equation 14}$$

where $s_{shear,IG}$ represents the initial guess of shear.

Figure 13:
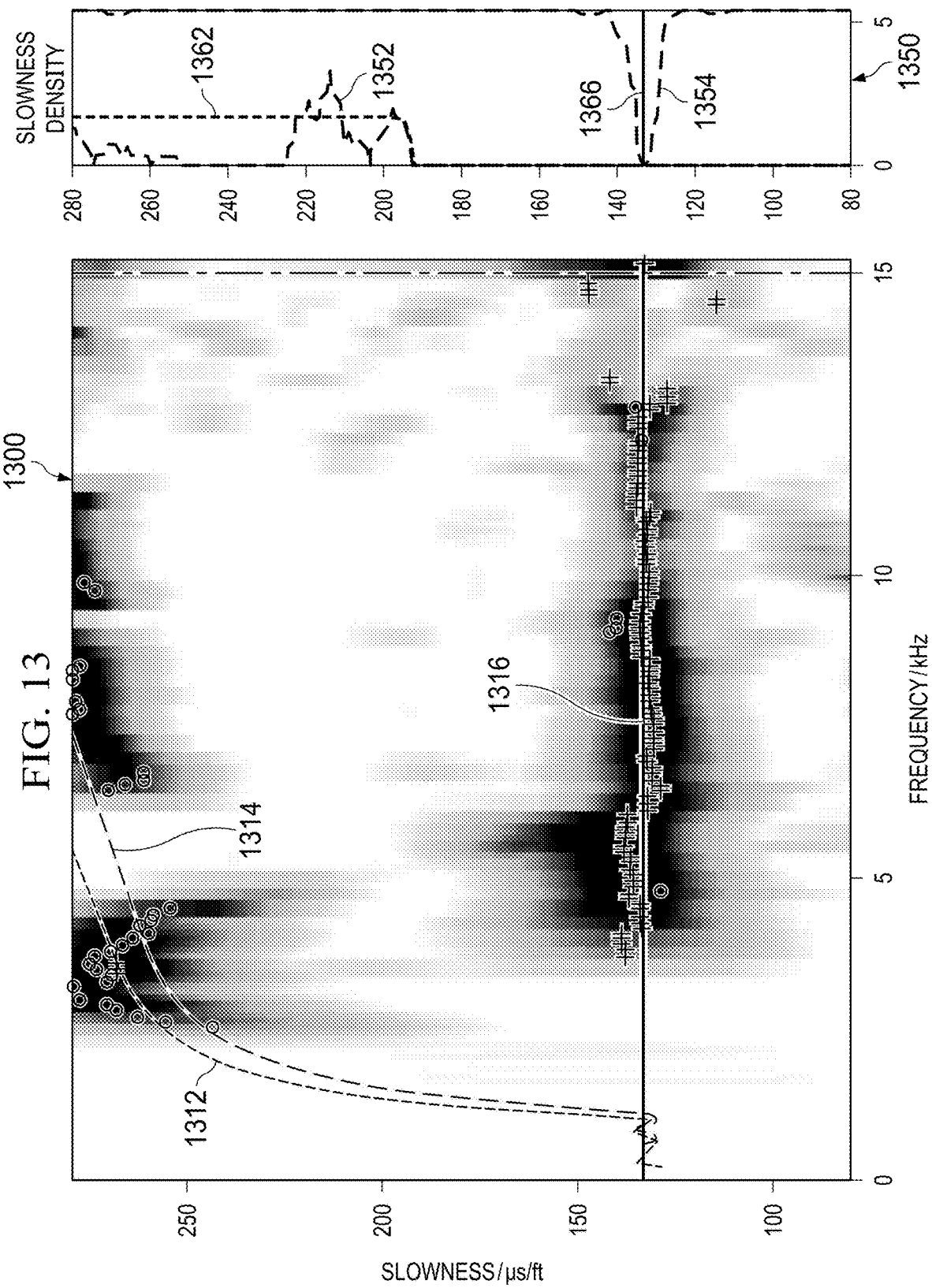
FIG. 13 illustrates a graph of optimization results.

In some embodiments, minimizing the objective function in Equation 14 yields an initial guess of a and b. Further, decreasing the misfit in Equation 13 near the initial guess yields the body wave slowness and the modal dispersions. In that regard, FIG. 13 illustrates a graph 1300 of optimization results by Equations 13 and 14 for the waveform data of FIG. 3. In the embodiment of FIG. 13, dashed line 1312 represents the modal curves for the first screw waves from the initial guess of shear wave slowness and adjustable parameters. Further, curve 1314 represents the final estimates of the modal curves for the first screw waves, whose low-frequency asymptote represents the shear wave slowness. Further, line 1316 represents the final slowness estimates of the second waves, which are combinations of the refracted shear waves and the high order screw waves. Further, right subplot 1350 displays the slowness density map for the first and the second waves as quality control metrics. Line 1352 represents the slowness density log of the first screw waves, whereas line 1354 represents the slowness density log of high order screw waves. Further, dashed line 1362 represents fitting results of the leading edge of the curve 1352, and line 1366 represents the final formation body wave slowness of the processing.

Figure 14:
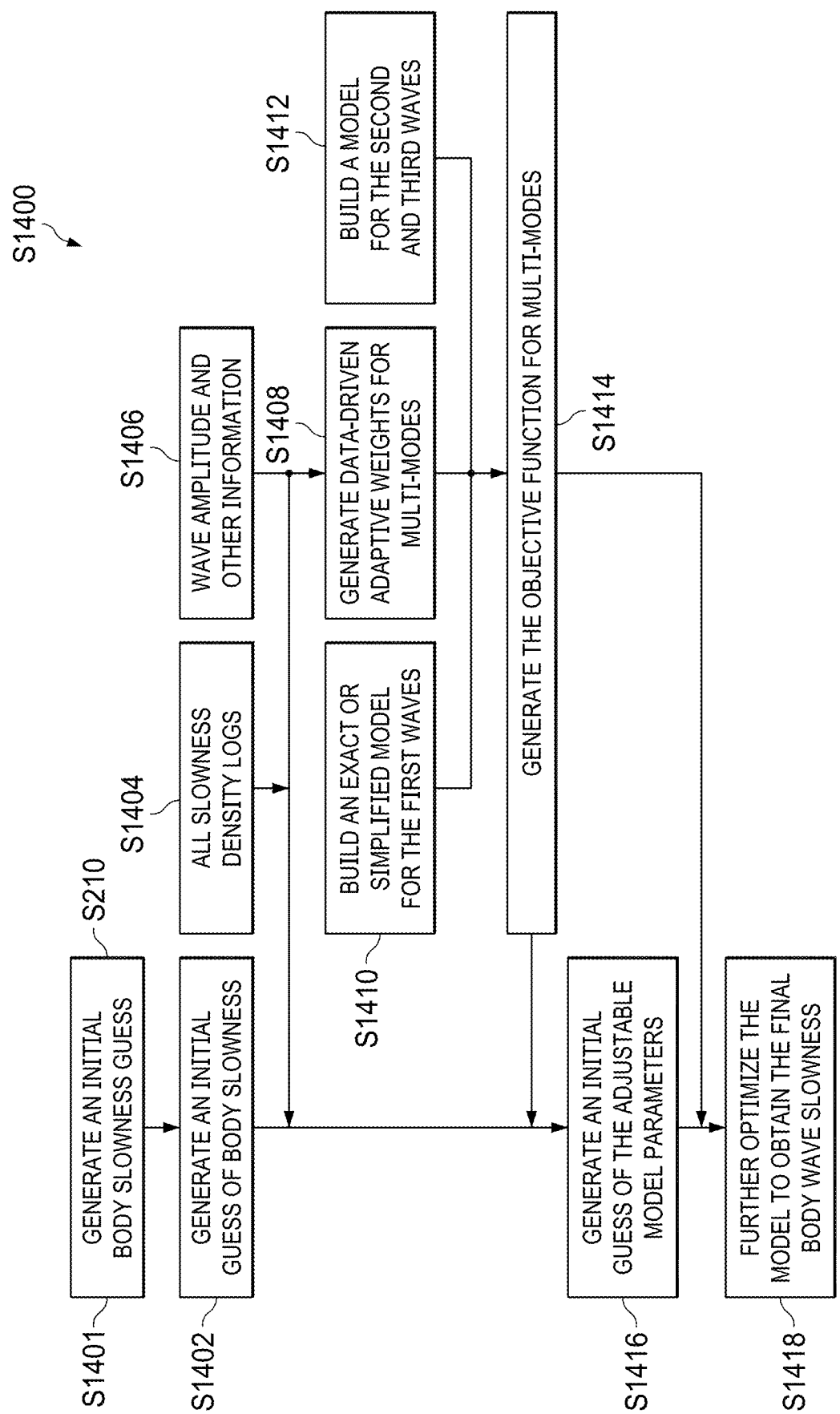
FIG. 14 is a flowchart of a process to improve a model to obtain a final body wave slowness.

FIG. 14 is a flowchart of a process 1400 to improve a model to obtain a final body wave slowness. Although the operations in process 1400 are shown in a particular sequence, certain operations may be performed in different sequences or at the same time where feasible. Further, in some embodiments, only certain operations of process 1400 are performed at a time.

At block S1402, an initial body slowness guess of a wave is generated. In some embodiments, operations performed at block S1402 are similar or identical to operations performed at block S210 of FIG. 2. Further, at blocks S1404 and 1406, slowness density logs of the waves, and the wave amplitudes of the waves are determined, respectively. At block S1408, the initial guess of the body slowness guess, the slowness density logs, the wave amplitudes, and other information wave SNR are utilized to generate a set of data-driven adaptive weights for all the modes. As referred to herein, data driven denotes that the weights are calculated from the raw data rather than the modeling. In some embodiments, and according to the target of the processing, different portions of the modes are valued with different weights, which are calculated from initial guess, slowness density logs and the wave amplitudes. For example, where the initial guess is obtained from the second waves, additional weights are applied to the second waves.

Concurrently and/or alternatively to block S1408, at block S1410 and S1412 an exact and simplified model for the first waves and the second waves are built, respectively. Although FIG. 14 illustrates blocks S1408, S1410, and S1412, in some embodiments, one or more of operations at blocks S1408, S1410, and S1412 are performed. At Block 1414, an objective function is generated based on the models, measurements, and the weights obtained from one or more of operations performed at blocks S1408, S1410, and S1412. At block S1416, an initial guess of the model adjustable parameter is generated by reducing or minimizing the objective function using the initial body slowness guess obtained by operations performed at block S1402. At block S1418, all the modeling parameters, including the body wave slowness and adjustable parameters, are improved or optimized by reducing the misfit between the modeling and the measurements. In some embodiments, the final body wave slowness and modal dispersion from the model are outputted as the final results.

Figure 15:
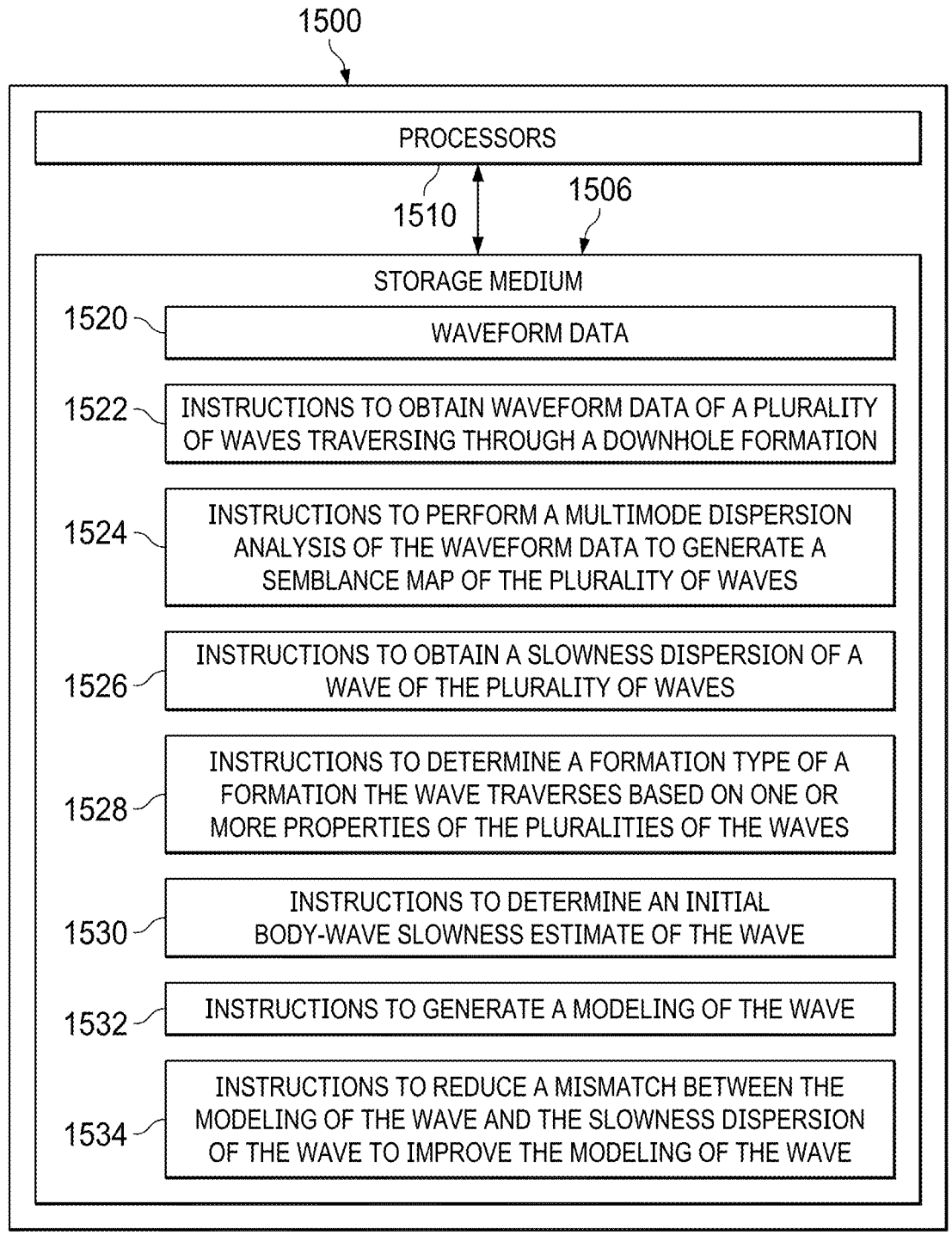
FIG. 15 is a block diagram of a multi-mode dispersion estimation system.

FIG. 15 is a block diagram of a multi-mode dispersion estimation system 1500. Multi-mode dispersion estimation system 1500 includes a storage medium 1506 and processors 1510. Storage medium 1506 may be formed from data storage components such as, but not limited to, read-only memory (ROM), random access memory (RAM), flash memory, magnetic hard drives, solid-state hard drives, CD-ROM drives, DVD drives, floppy disk drives, as well as other types of data storage components and devices. In some embodiments, storage medium 1506 includes multiple data storage devices. In further embodiments, the multiple data storage devices may be physically stored at different locations. Waveform data, data associated with the downhole formation, and data obtained from logging while drilling and wireline logging operations are stored at a first location 1520 of storage medium 1506. As shown in FIG. 15, instructions to obtain waveform data of a plurality of waves traversing through a downhole formation are stored at a second location 1522 of storage medium 1506, instructions to perform a multimode dispersion analysis of the waveform data to generate a semblance map of the plurality of waves are stored at a third location 1524 of the storage medium 1506, instructions to obtain a slowness dispersion of a wave of the plurality of waves are stored at a fourth location 1526 of storage medium 1506, instructions to determine a formation type of a formation the wave traverses based on one or more properties of the plurality of the waves are stored at a fifth location 1528 of storage medium 1506, instructions to determine an initial body wave slowness estimate of the wave are stored at a sixth location 1530 of storage medium 1506, instructions to generate a modeling of the wave are stored at a seventh location 1532 of storage medium 1506, and instructions to reduce a mismatch between the modeling of the wave and the slowness dispersion of the wave to improve the modeling of the wave are stored at an eighth location 1534 of storage medium 1506. The instructions to perform other operations described herein are also stored in the storage medium 1506.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, a method to estimate slowness from multi-borehole modes, the method comprising: obtaining waveform data of a plurality of waves traversing through a downhole formation, wherein each wave of the plurality of waves has a different threshold cutoff frequency; performing a multimode dispersion analysis of the waveform data to generate a semblance map of the plurality of waves; obtaining a slowness dispersion of a wave of the plurality of waves; determining a formation type of a formation the wave traverses based on one or more properties of the plurality of the waves; determining an initial body wave slowness estimate of the wave; generating a modeling of the wave; and reducing a mismatch between the modeling of the wave and the slowness dispersion of the wave to improve the modeling of the wave.

Clause 2, the method of clause 1, wherein after reducing the mismatch between the modeling of the wave and the slowness dispersion of the wave, the method further comprising: determining an actual body wave slowness from the modeling; and determining an actual slowness dispersion of the wave from the modeling.

Clause 3 method of clause 2, further comprising: obtaining a second slowness dispersion of a second wave of the plurality of waves; generating a second modeling of a second wave; and reducing a second mismatch between the second modeling and the second slowness dispersion to improve the second modeling.

Clause 4, the method of any of clauses 1-3, further comprising: analyzing one or more peaks of the semblance map; and extracting a slowness dispersion of the wave from the one or more peaks of the semblance map to obtain the slowness dispersion of the wave.

Clause 5, the method of any of clauses 1-4, further comprising removing a tool wave from the semblance map, wherein the formation type of the wave is determined after the tool wave is removed from the semblance map.

Clause 6, the method of any of clauses 1-5, further comprising: determining a slowness of the wave; and determining a slowness of a second wave of the plurality of waves, wherein the slowness of the wave and the slowness of the second wave are properties of the one or more properties of the plurality of waves, and wherein the formation type of the wave is determined based on the slowness of the wave and the slowness of the second wave.

Clause 7, the method of clause 6, further comprising: generating a dispersion map of the wave; extracting a dispersion of the wave from the dispersion map generating a slowness density log of the wave; and extracting a reference slowness of the wave from the slowness density log of the wave, wherein the formation type is determined based on the reference slowness of the wave.

Clause 8, the method of clause 7, further comprising: generating a slowness density log of a formation body wave slowness of the wave; and analyzing one or more peaks of the slowness density log of the formation body wave slowness of the wave to determine a predicted body wave slowness of the wave, wherein the formation type is determined based on the predicted body wave slowness of the wave.

Clause 9, the method of clause 8, further comprising determining an edge slowness of the wave based on the slowness density log of the wave and the slowness density log of the formation body wave slowness of the wave, wherein the formation type is determined based on edge slowness of the wave.

Clause 10, the method of clause 9, further comprising: performing a frequency-domain processing operation to extract a dispersion of the second wave; performing a time-domain semblance processing operation of the second wave to determine one or more peaks of the second wave; generating a slowness density log of the second wave based on the one or more peaks of the second wave and the dispersion of the second wave; and analyzing one or more peaks of the slowness density log of the second wave to determine a predicted body slowness of the second wave, wherein the formation type is determined based on the predicted body slowness of the second wave.

Clause 11, the method of any of clauses 1-10, further comprising analyzing a semblance map of the wave, wherein determining the formation type is based on an analysis of the semblance map.

Clause 12, the method of any of clauses 1-11, further comprising determining, based on the formation type, a modal slowness and a modal category of the wave, wherein the initial body slowness estimate is determined based on the modal category and the modal slowness of the wave.

Clause 13, the method of any of clauses 1-12, further comprising determining an edge slowness of the wave, wherein in response to a determination that the formation type of the wave is a slow formation, designating the edge slowness of the wave as the initial body slowness estimate of the wave.

Clause 14, the method of clause 13, wherein in response to a determination that the formation type of the wave is not a slow formation, the method further comprising: obtaining waveform data of a second wave; determining, from the waveform data of the second wave, whether a shear slowness peak of a shear of the second wave is coherent and continuous in a frequency axis; and in response to a determination that the shear slowness peak is coherent and continuous in the frequency axis, designating a slowness of the shear of the second wave as the initial body slowness estimate of the wave.

Clause 15, the method of clause 14, wherein in response to a determination that the shear slowness peak is not coherent and continuous in the frequency axis, the method further comprising: determining whether a slowness of the second wave is within a threshold distance from the edge slowness of the wave; in response to a determination that the slowness of the second wave is within a threshold distance from the edge slowness of the wave, designating a slowness of the shear of the second wave as the initial body slowness estimate of the wave, and in response to a determination that the slowness of the second wave is not within a threshold distance from the edge slowness of the wave, designating the edge slowness of the wave as the initial body slowness estimate of the wave.

Clause 16, a multi-mode dispersion estimation system, comprising: a storage medium; and one or more processors configured to: obtain waveform data of a plurality of waves traversing through a downhole formation, wherein each wave of the plurality of waves has a different threshold cutoff frequency; perform a multimode dispersion analysis of the waveform data to generate a semblance map of the plurality of waves; obtain a slowness dispersion of a wave of the plurality of waves; determine a formation type of a formation the wave traverses based on one or more properties of the plurality of the waves; determine an initial body wave slowness estimate of the wave; generate a modeling of the wave; and reduce a mismatch between the modeling of the wave and the slowness dispersion of the wave to improve the modeling of the wave.

Clause 17, the multi-mode dispersion estimation system of clause 16, wherein the one or more processors are further configured to: analyze one or more peaks of the semblance map; and extract a slowness dispersion of the wave from the one or more peaks of the semblance map.

Clause 18, the multi-mode dispersion estimation system of clause 17, wherein the one or more processors are further configured to: obtain waveform data of a second wave; perform a multimode dispersion analysis of the waveform data of the second wave to generate a second semblance map of the second wave; analyze one or more peaks of the second semblance map; extract a slowness dispersion of a second wave from the one or more peaks of the second semblance map; generate a modeling of a second wave; and reduce a mismatch between the modeling of the second wave and the slowness dispersion of the wave to improve the modeling of the second wave.

Clause 19, a non-transitory machine readable medium having one or more instructions which, when executed by a processor, cause the processors to perform operations comprising: obtaining waveform data of a plurality of waves traversing through a downhole formation, wherein each wave of the plurality of waves has a different threshold cutoff frequency; performing a multimode dispersion analysis of the waveform data to generate a semblance map of the plurality of waves; obtaining a slowness dispersion of a wave of the plurality of waves; determining a formation type of a formation the wave traverses based on one or more properties of the plurality of the waves; and determining an initial body wave slowness estimate of the wave; generating a modeling of the wave; and reducing a mismatch between the modeling of the wave and the slowness dispersion of the wave to improve the modeling of the wave.

Clause 20, the non-transitory machine readable medium of clause 19, wherein the instructions which, when executed by the processor, cause the processor to further perform operations comprising: obtaining waveform data of a second wave; performing a multimode dispersion analysis of the waveform data of the second wave to generate a second semblance map of the second wave; analyzing one or more peaks of the second semblance map; extracting a slowness dispersion of a second wave from the one or more peaks of the second semblance map; generating a modeling of a second wave; and reducing a mismatch between the modeling of the second wave and the slowness dispersion of the wave to improve the modeling of the second wave.

As used herein, the singular forms "a," "an," and "the" are intended to include the plural forms as well, unless the context clearly indicates otherwise. It will be further understood that the terms "comprise" and/or "comprising," when used in this specification and/or in the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A method to estimate slowness from multi-borehole modes, the method comprising:
   obtaining waveform data of a plurality of waves traversing through a downhole formation, wherein each wave of the plurality of waves has a different threshold cutoff frequency;
   performing a multimode dispersion analysis of the waveform data to generate a semblance map of the plurality of waves;
   obtaining a slowness dispersion of a wave of the plurality of waves;
   determining a formation type of a formation the wave traverses based on one or more properties of the plurality of the waves;
   determining an initial body wave slowness estimate of the wave;
   determining an edge slowness of the wave;
   in response to a determination that the formation type of the formation is a slow formation, designating the edge slowness of the wave as the initial body wave slowness estimate of the wave;
   generating a modeling of the wave; and
   reducing a mismatch between the modeling of the wave and the slowness dispersion of the wave to improve the modeling of the wave.

2. The method of claim 1, wherein after reducing the mismatch between the modeling of the wave and the slowness dispersion of the wave, the method further comprising:
   determining an actual body wave slowness from the modeling; and
   determining an actual slowness dispersion of the wave from the modeling.

3. The method of claim 2, further comprising:
   obtaining a second slowness dispersion of a second wave of the plurality of waves;
   generating a second modeling of a second wave; and
   reducing a second mismatch between the second modeling and the second slowness dispersion to improve the second modeling.

4. The method of claim 1, further comprising:
   analyzing one or more peaks of the semblance map; and
   extracting a slowness dispersion of the wave from the one or more peaks of the semblance map to obtain the slowness dispersion of the wave.

5. The method of claim 1, further comprising removing a tool wave from the semblance map, wherein the formation type of the formation is determined after the tool wave is removed from the semblance map.

6. The method of claim 1, further comprising:
   determining a slowness of the wave; and
   determining a slowness of a second wave of the plurality of waves,
   wherein the slowness of the wave and the slowness of the second wave are properties of the one or more properties of the plurality of waves, and wherein the formation type of the formation is determined based on the slowness of the wave and the slowness of the second wave.

7. The method of claim 1, wherein in response to a determination that the formation type of the formation is not a slow formation, the method further comprising:
   obtaining waveform data of a second wave;
   determining, from the waveform data of the second wave, whether a shear slowness peak of a shear of the second wave is coherent and continuous in a frequency axis; and
   in response to a determination that the shear slowness peak is coherent and continuous in the frequency axis, designating a slowness of the shear of the second wave as the initial body wave slowness estimate of the wave.

8. The method of claim 7, wherein in response to a determination that the shear slowness peak is not coherent and continuous in the frequency axis, the method further comprising:
   determining whether a slowness of the second wave is within a threshold distance from the edge slowness of the wave;
   in response to a determination that the slowness of the second wave is within a threshold distance from the edge slowness of the wave, designating a slowness of the shear of the second wave as the initial body wave slowness estimate of the wave, and
   in response to a determination that the slowness of the second wave is not within a threshold distance from the edge slowness of the wave, designating the edge slowness of the wave as the initial body wave slowness estimate of the wave.

9. A multi-mode dispersion estimation system, comprising:
   a storage medium; and
   one or more processors configured to:
   obtain waveform data of a plurality of waves traversing through a downhole formation, wherein each wave of the plurality of waves has a different threshold cutoff frequency;
   perform a multimode dispersion analysis of the waveform data to generate a semblance map of the plurality of waves;
   obtain a slowness dispersion of a wave of the plurality of waves;
   determine a formation type of a formation the wave traverses based on one or more properties of the plurality of the waves;
   determine an initial body wave slowness estimate of the wave;
   determine an edge slowness of the wave;

in response to a determination that the formation type of the formation is a slow formation, designate the edge slowness of the wave as the initial body wave slowness estimate of the wave generate a modeling of the wave; and reduce a mismatch between the modeling of the wave and the slowness dispersion of the wave to improve the modeling of the wave.

10. The multi-mode dispersion estimation system of claim 9, wherein the one or more processors are further configured to:

analyze one or more peaks of the semblance map; and extract a slowness dispersion of the wave from the one or more peaks of the semblance map.

11. The multi-mode dispersion estimation system of claim 10, wherein the one or more processors are further configured to:

obtain waveform data of a second wave;

perform a multimode dispersion analysis of the waveform data of the second wave to generate a second semblance map of the second wave;

analyze one or more peaks of the second semblance map;

extract a slowness dispersion of a second wave from the one or more peaks of the second semblance map;

generate a modeling of a second wave; and reduce a mismatch between the modeling of the second wave and the slowness dispersion of the wave to improve the modeling of the second wave.

12. A non-transitory machine readable medium having one or more instructions which, when executed by a processor, cause the processors to perform operations comprising:

obtaining waveform data of a plurality of waves traversing through a downhole formation, wherein each wave of the plurality of waves has a different threshold cutoff frequency;

performing a multimode dispersion analysis of the waveform data to generate a semblance map of the plurality of waves;

obtaining a slowness dispersion of a wave of the plurality of waves;

determining a formation type of a formation the wave traverses based on one or more properties of the plurality of the waves;

determining an initial body wave slowness estimate of the wave;

determining an edge slowness of the wave;

in response to a determination that the formation type of the formation is a slow formation, designating the edge slowness of the wave as the initial body wave slowness estimate of the wave generating a modeling of the wave; and reducing a mismatch between the modeling of the wave and the slowness dispersion of the wave to improve the modeling of the wave.

13. The non-transitory machine readable medium of claim 12, wherein the instructions which, when executed by the processor, cause the processor to further perform operations comprising:

obtaining waveform data of a second wave;

performing a multimode dispersion analysis of the waveform data of the second wave to generate a second semblance map of the second wave;

analyzing one or more peaks of the second semblance map;

extracting a slowness dispersion of a second wave from the one or more peaks of the second semblance map;

generating a modeling of a second wave; and reducing a mismatch between the modeling of the second wave and the slowness dispersion of the wave to improve the modeling of the second wave.

* * * * *

UNITED STATES PATENT AND TRADEMARK OFFICE
CERTIFICATE OF CORRECTION

| | | |
|---|---|---|
| PATENT NO. | : 12,038,546 B2 | Page 1 of 1 |
| APPLICATION NO. | : 17/171749 | |
| DATED | : July 16, 2024 | |
| INVENTOR(S) | : Ruijia Wang et al. | |

It is certified that error appears in the above-identified patent and that said Letters Patent is hereby corrected as shown below:

On the Title Page

Item [54] and in the Specification, Column 1, Lines 1-5:
Correct title is -- METHODS TO ESTIMATE FORMATION SLOWNESS FROM MULTI-BOREHOLE MODES AND OF A MULTI-MODE DISPERSION WAVE AND MULTI-MODE DISPERSION ESTIMATION SYSTEMS --

Signed and Sealed this
Tenth Day of December, 2024

Katherine Kelly Vidal
*Director of the United States Patent and Trademark Office*